US012335875B2

(12) United States Patent
Abedini et al.

(10) Patent No.: US 12,335,875 B2
(45) Date of Patent: Jun. 17, 2025

(54) COVERAGE ADAPTATION AND IMPACT ON IDLE USER EQUIPMENT (UE)

(71) Applicant: QUALCOMM Incorporated, San Diego, CA (US)

(72) Inventors: Navid Abedini, Basking Ridge, NJ (US); Naeem Akl, Somerville, NJ (US); Tao Luo, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 378 days.

(21) Appl. No.: 17/847,574

(22) Filed: Jun. 23, 2022

(65) Prior Publication Data

US 2023/0422174 A1   Dec. 28, 2023

(51) Int. Cl.
*H04W 52/02* (2009.01)
(52) U.S. Cl.
CPC .............................. *H04W 52/0261* (2013.01)
(58) Field of Classification Search
CPC ................................................ H04W 52/0261
USPC ......................................................... 370/411
See application file for complete search history.

(56) References Cited

U.S. PATENT DOCUMENTS

| 9,363,716 | B1 | 6/2016 | Sung et al. | |
| 2019/0394805 | A1* | 12/2019 | Kim | H04W 74/0833 |
| 2021/0160703 | A1 | 5/2021 | Luo et al. | |
| 2021/0360493 | A1* | 11/2021 | Shrestha | H04W 36/0061 |
| 2023/0388904 | A1* | 11/2023 | Wei | H04W 48/14 |

OTHER PUBLICATIONS

3GPP TR 32.826: "3rd Generation Partnership Project, Technical Specification Group Services and System Aspects, Telecommunication Management, Study on Energy Savings Management (ESM) (Release 10)", 3GPP Standard, 3GPP TR 32.826, 3rd Generation Partnership Project, Mobile Competence Centre, 650, Route Des Lucioles, F-06921 Sophia-Antipolis Cedex, France, No. V10.0.0, Mar. 30, 2010, pp. 1-33, XP050402127, p. 10, section 5 Concepts and Background—p. 17, section 6.3 High-level use cases, figures 6.3-6.3.4.
International Search Report and Written Opinion—PCT/US2023/067362—ISA/EPO—Aug. 3, 2023.

* cited by examiner

*Primary Examiner* — Gbemileke J Onamuti
(74) *Attorney, Agent, or Firm* — Holland & Hart LLP

(57) ABSTRACT

Methods, systems, and devices for wireless communications are described. A user equipment (UE) may communicate with a network entity within a first coverage area associated with a first wireless cell. The UE may receive a system information (SI) update indication that indicates a modification of the first coverage area to a second coverage area. The SI update indication may also include one or more thresholds that the UE may use to determine whether the UE is to receive an updated SI message associated with the modification of the first coverage area to the second coverage area, or whether the UE is to skip receiving the updated SI message associated with the modification of the first coverage area to the second coverage area. The UE then determines whether to receive the updated SI message based on the one or more thresholds.

28 Claims, 17 Drawing Sheets

225 ▨ System Information Update Indication

230 ▨ Updated System Information Message

200

COVERAGE ADAPTATION AND IMPACT ON IDLE USER EQUIPMENT (UE)

FIELD OF TECHNOLOGY

The following relates to wireless communications, including coverage adaptation and impact on idle user equipment (UE).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

Some network devices in a wireless communications system may support various power saving modes to reduce overall system energy consumption while maintaining reliable communications with UEs.

SUMMARY

The described techniques relate to improved methods, systems, devices, and apparatuses that support coverage adaptation and impact on idle user equipment (UE). For example, the described techniques support increased power savings in a wireless communications system. In some examples, one or more inactive or idle UE located in a first coverage area may be affected by a change in coverage area performed by a network entity. In such cases, the one or more UEs may wake up to receive a system information update indication notifying the UEs of the change in coverage area, and the associated updated system information. In some cases, however, the UEs may be unaffected by the coverage change, and may determine to skip receiving the updated system information based on evaluating one or more thresholds included in the system information update indication. In some other examples, the system information update indication may include additional information to inform the UEs of cell selection and reselection details, coverage change timing information, or a combination thereof.

A method for wireless communication at a UE is described. The method may include communicating with a network entity within a first coverage area associated with a first wireless cell, receiving a system information (SI) update indication that indicates a modification of the first coverage to a second coverage area associated with the first wireless cell, and one or more thresholds indicating whether the UE is to receive an updated SI message associated with the modification of the first coverage area to the second coverage area of the first wireless cell; or whether the UE is to skip receiving the updated SI message associated with the modification of the first coverage area to the second coverage area of the first wireless cell, and determining whether to receive the updated SI message based on the one or more thresholds.

An apparatus for wireless communication at a UE is described. The apparatus may include a processor, memory coupled with the processor, and instructions stored in the memory. The instructions may be executable by the processor to cause the apparatus to communicate with a network entity within a first coverage area associated with a first wireless cell, receive an SI update indication that indicates a modification of the first coverage to a second coverage area associated with the first wireless cell, and one or more thresholds indicating whether the UE is to receive an updated SI message associated with the modification of the first coverage area to the second coverage area of the first wireless cell; or whether the UE is to skip receiving the updated SI message associated with the modification of the first coverage area to the second coverage area of the first wireless cell, and determine whether to receive the updated SI message based on the one or more thresholds.

Another apparatus for wireless communication at a UE is described. The apparatus may include means for communicating with a network entity within a first coverage area associated with a first wireless cell, means for receiving an SI update indication that indicates a modification of the first coverage to a second coverage area associated with the first wireless cell, and one or more thresholds indicating whether the UE is to receive an updated SI message associated with the modification of the first coverage area to the second coverage area of the first wireless cell; or whether the UE is to skip receiving the updated SI message associated with the modification of the first coverage area to the second coverage area of the first wireless cell, and means for determining whether to receive the updated SI message based on the one or more thresholds.

A non-transitory computer-readable medium storing code for wireless communication at a UE is described. The code may include instructions executable by a processor to communicate with a network entity within a first coverage area associated with a first wireless cell, receive an SI update indication that indicates a modification of the first coverage to a second coverage area associated with the first wireless cell, and one or more thresholds indicating whether the UE is to receive an updated SI message associated with the modification of the first coverage area to the second coverage area of the first wireless cell; or whether the UE is to skip receiving the updated SI message associated with the modification of the first coverage area to the second coverage area of the first wireless cell, and determine whether to receive the updated SI message based on the one or more thresholds.

In some examples of the method, apparatuses, and non-transitory computer-readable medium described herein, the one or more thresholds include a synchronization signal-reference signal receive power (SS-RSRP) threshold and the method, apparatuses, and non-transitory computer-readable medium may include further operations, features, means, or instructions for receiving, in one or more bits of the SI update indication, a mapping that associates the SS-RSRP threshold to the first coverage area or the second coverage area and receiving the updated SI based on a measured SS-RSRP at the UE being less than the SS-RSRP threshold in accordance with the mapping.

Some examples of the method, apparatuses, and non-transitory computer-readable medium described herein may further include operations, features, means, or instructions for receiving the SI update indication via a short message in a paging physical downlink control channel (PDCCH) or via a PEI-PDCCH.

In some examples of the method, apparatuses, and non-transitory computer-readable medium described herein, the mapping indicates one or more UE groups that may be associated with different SS-RSRP thresholds and the method, apparatuses, and non-transitory computer-readable medium may include further operations, features, means, or instructions for determining, in accordance with the mapping, that the UE may be part of a UE group of the one or more UE groups that may be to receive the updated SI message based on the SS-RSRP threshold and receiving the updated SI message based on the determining.

In some examples of the method, apparatuses, and non-transitory computer-readable medium described herein, the mapping may be further based on a mobility state of the UE.

In some examples of the method, apparatuses, and non-transitory computer-readable medium described herein, the mapping indicates one or more UE groups that may be associated with different SS-RSRP thresholds and the method, apparatuses, and non-transitory computer-readable medium may include further operations, features, means, or instructions for receiving the SI update indication via a downlink control channel, receiving the mapping via a downlink shared channel scheduled by the downlink control channel, and receiving the updated SI message based on the mapping.

In some examples of the method, apparatuses, and non-transitory computer-readable medium described herein, the SI update indication further includes one or more cell selection parameters associated with the updated SI message.

Some examples of the method, apparatuses, and non-transitory computer-readable medium described herein may further include operations, features, means, or instructions for receiving a control message that indicates a change in one or more modes of operation associated with the modification of the first coverage area to the second coverage area of the first wireless cell.

In some examples of the method, apparatuses, and non-transitory computer-readable medium described herein, the modification of the first coverage area to the second coverage area of the first wireless cell indicates a deactivation of at least a portion of the first wireless cell, an activation of at least a portion of the first wireless cell, a change in coverage of the first wireless cell, or any combination thereof.

In some examples of the method, apparatuses, and non-transitory computer-readable medium described herein, the one or more thresholds include one or more coverage change thresholds and the method, apparatuses, and non-transitory computer-readable medium may include further operations, features, means, or instructions for receiving a list of one or more adjacent wireless cells different from the first wireless cell as part of the updated SI message, the one or more adjacent wireless cells being available for re-selection by the UE based on the coverage change of the first wireless cell satisfying the one or more coverage change thresholds.

In some examples of the method, apparatuses, and non-transitory computer-readable medium described herein, the list of one or more adjacent wireless cells may be based on one or more beam directions associated with the first wireless cell.

In some examples of the method, apparatuses, and non-transitory computer-readable medium described herein, the updated SI message further indicates a change in synchronization signal transmission power associated with the first wireless cell.

In some examples of the method, apparatuses, and non-transitory computer-readable medium described herein, the list of one or more adjacent wireless cells further indicates a set of restricted cells being unavailable for re-selection by the UE based on the coverage change of the first wireless cell.

In some examples of the method, apparatuses, and non-transitory computer-readable medium described herein, the one or more thresholds include a timing threshold indicative of timing information for a time in which the modification of the first coverage area to the second coverage area of the first wireless cell may be to occur and the method, apparatuses, and non-transitory computer-readable medium may include further operations, features, means, or instructions for determining whether to receive the updated SI message based on a time that the UE may be scheduled to receive the updated SI message satisfying the timing threshold.

Some examples of the method, apparatuses, and non-transitory computer-readable medium described herein may further include operations, features, means, or instructions for receiving the timing threshold indicative of the timing information via a downlink shared channel scheduled by a downlink control channel, the downlink control channel scrambled by a radio network temporary identifier (RNTI) associated with the updated SI message.

In some examples of the method, apparatuses, and non-transitory computer-readable medium described herein, the timing threshold may be further indicative of a time in which the first wireless cell restricts access for the UE, enables access for the UE, changes relative transmission power, or any combination thereof.

In some examples of the method, apparatuses, and non-transitory computer-readable medium described herein, the timing threshold includes a relative timing threshold or an absolute timing threshold based on the modification of the first coverage area to the second coverage area of the first wireless cell.

In some examples of the method, apparatuses, and non-transitory computer-readable medium described herein, the timing threshold includes a timing interval for a transition the first coverage area to the second coverage area of the first wireless cell and the method, apparatuses, and non-transitory computer-readable medium may include further operations, features, means, or instructions for receiving cell coverage transition information, power ramping information, or both, to apply during the transition the first coverage area to the second coverage area.

A method for wireless communication at a network entity is described. The method may include communicating with a UE within a first coverage area associated with a first wireless cell, transmitting, to the UE, an SI update message indicating a modification of the first coverage area to a second coverage area associated with the first wireless cell, and an indication of one or more thresholds indicating transmission of an updated SI message associated with the modification of the first coverage area to the second coverage area of the first wireless cell, and modifying the coverage area of the first wireless cell from the first coverage area to the second coverage area.

An apparatus for wireless communication at a network entity is described. The apparatus may include a processor, memory coupled with the processor, and instructions stored in the memory. The instructions may be executable by the processor to cause the apparatus to communicate with a UE within a first coverage area associated with a first wireless cell, transmit, to the UE, an SI update message indicating a modification of the first coverage area to a second coverage area associated with the first wireless cell, and an indication of one or more thresholds indicating transmission of an updated SI message associated with the modification of the first coverage area to the second coverage area of the first wireless cell, and modify the coverage area of the first wireless cell from the first coverage area to the second coverage area.

Another apparatus for wireless communication at a network entity is described. The apparatus may include means for communicating with a UE within a first coverage area associated with a first wireless cell, means for transmitting, to the UE, an SI update message indicating a modification of the first coverage area to a second coverage area associated with the first wireless cell, and an indication of one or more thresholds indicating transmission of an updated SI message associated with the modification of the first coverage area to the second coverage area of the first wireless cell, and means for modifying the coverage area of the first wireless cell from the first coverage area to the second coverage area.

A non-transitory computer-readable medium storing code for wireless communication at a network entity is described. The code may include instructions executable by a processor to communicate with a UE within a first coverage area associated with a first wireless cell, transmit, to the UE, an SI update message indicating a modification of the first coverage area to a second coverage area associated with the first wireless cell, and an indication of one or more thresholds indicating transmission of an updated SI message associated with the modification of the first coverage area to the second coverage area of the first wireless cell, and modify the coverage area of the first wireless cell from the first coverage area to the second coverage area.

In some examples of the method, apparatuses, and non-transitory computer-readable medium described herein, the one or more thresholds include a SS-RSRP threshold and the method, apparatuses, and non-transitory computer-readable medium may include further operations, features, means, or instructions for transmitting, in one or more bits of the SI update indication, a mapping that associates the SS-RSRP threshold to the first coverage area or the second coverage area and transmitting the updated SI message to the UE.

Some examples of the method, apparatuses, and non-transitory computer-readable medium described herein may further include operations, features, means, or instructions for transmitting the SI update indication via a short message in a paging PDCCH or via a PEI-PDCCH.

In some examples of the method, apparatuses, and non-transitory computer-readable medium described herein, the mapping indicates one or more UE groups that may be associated with different SS-RSRP thresholds and the method, apparatuses, and non-transitory computer-readable medium may include further operations, features, means, or instructions for transmitting, to the UE, the updated SI message based on the mapping.

In some examples of the method, apparatuses, and non-transitory computer-readable medium described herein, the mapping indicates one or more UE groups that may be associated with different SS-RSRP thresholds and the method, apparatuses, and non-transitory computer-readable medium may include further operations, features, means, or instructions for transmitting the SI update indication via a downlink control channel, transmitting the mapping via a downlink shared channel scheduled by the downlink control channel, and transmitting updated SI message based on the mapping.

In some examples of the method, apparatuses, and non-transitory computer-readable medium described herein, the one or more thresholds include one or more coverage change thresholds and the method, apparatuses, and non-transitory computer-readable medium may include further operations, features, means, or instructions for transmitting, to the UE, a list of one or more adjacent wireless cells different from the first wireless cell as part of the updated SI message, the one or more adjacent wireless cells being available for re-selection by the UE based on the coverage change of the first wireless cell satisfying the one or more coverage change thresholds.

In some examples of the method, apparatuses, and non-transitory computer-readable medium described herein, the updated SI message further indicates a change in synchronization signal transmission power associated with the first wireless cell.

In some examples of the method, apparatuses, and non-transitory computer-readable medium described herein, the list of one or more adjacent wireless cells further indicates a set of restricted cells being unavailable for re-selection by the UE based on the coverage change of the first wireless cell.

In some examples of the method, apparatuses, and non-transitory computer-readable medium described herein, the one or more thresholds include a timing threshold indicative of timing information for a time in which the modification of the first coverage area to the second coverage area of the first wireless cell may be to occur and the method, apparatuses, and non-transitory computer-readable medium may include further operations, features, means, or instructions for transmitting the updated SI message based on the timing threshold.

In some examples of the method, apparatuses, and non-transitory computer-readable medium described herein, the timing threshold includes a timing interval for a transition the first coverage area to the second coverage area of the first wireless cell and the method, apparatuses, and non-transitory computer-readable medium may include further operations, features, means, or instructions for transmitting, to the UE, cell coverage transition information, power ramping information, or both.

DETAILED DESCRIPTION

Figure 1:
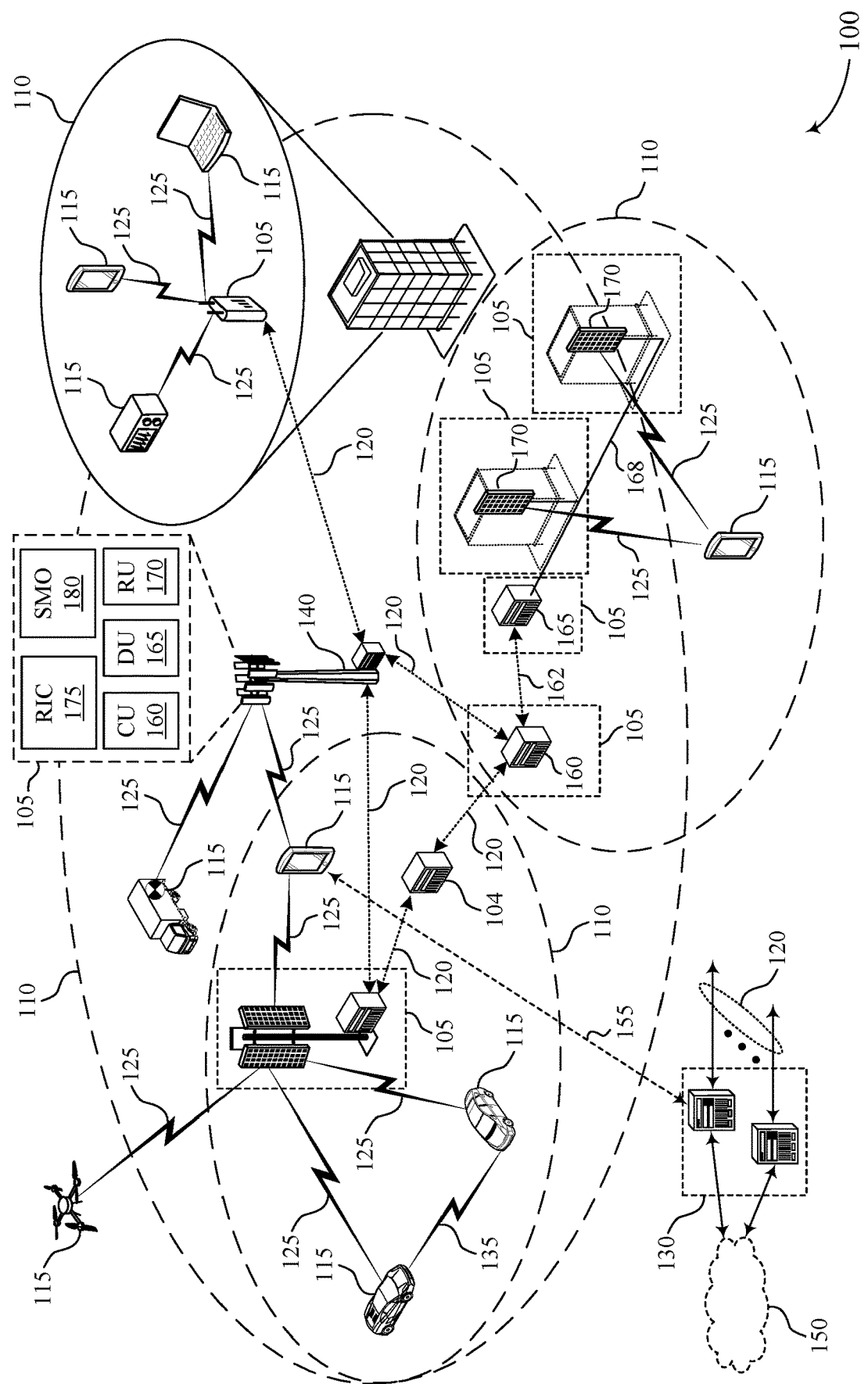
FIGS. 1 and 2 illustrate examples of wireless communications systems that supports coverage adaptation and impact on idle user equipment (UE) in accordance with one or more aspects of the present disclosure.

In some wireless communications systems, the coverage areas served by one or more network entities may be modified or adapted to accommodate various network energy savings modes. For example, a first network entity may serve one or more user equipment (UE) within a first geographic coverage area (e.g., coverage region), and may neighbor one or more adjacent network entities (e.g., each serving UEs within respective geographic coverage areas). In some examples, one or more of the network entities may reduce (e.g., deactivate) their corresponding geographic coverage areas to support network energy savings, and the first network entity may increase the first geographic coverage area to compensate for possible coverage loss associated with the one or more reduced coverage areas. Additionally or alternatively, the first network entity may reduce (e.g., deactivate) the first geographic coverage area to support network energy savings, and one or more of the adjacent network entities may increase their corresponding geographic coverage areas to compensate for the possible coverage loss associated with the reduced first geographic coverage area.

When a coverage area such as geographic coverage area or wireless cell is changed (e.g., reduced to support network energy savings or increased to compensate for a reduced coverage area), the network entities may perform a handover procedure for one or more UEs that are affected by the coverage change. For example, some UEs may be located in areas that were initially served by a first network entity (e.g., that has reduced the corresponding coverage area to support network energy savings) and are going to instead be served by a second network entity (e.g., that has increased the corresponding coverage area to compensate for one or more reduced coverage areas) for subsequent communications. To avoid loss of coverage for these UEs that experience a coverage change, the first network entity may indicate, to the second network entity, that a UE (e.g., located in an area that will no longer be within the reduced coverage area) is to be served by the second network entity for subsequent communications.

In some cases, one or more UEs that experience coverage area changes may be in an idle or inactive state, and the network entities may transmit a system information (SI) update, which may wake up all respective UEs served by the network entities. The SI update may indicate changes to one or more communication parameters (e.g., synchronization signal block (SSB) transmission power, access control information, SS-thresholds for random access channel (RACH) transmissions, cell selection criteria, cell reselection criteria, or any combination thereof), which each UE may receive in response to a change in coverage area. However, waking up to receive the SI update may lead to unnecessary power consumption by one or more of the receiving UEs. For example, one or more of the receiving UEs in an idle or inactive state may still be located within the reduced coverage area, and thus may be unaffected by the coverage change. In such cases, reacquiring the SI may lead to unnecessary power consumption since the UE uses power to wake up to receive the SI update.

Additionally or alternatively, one or more of the UEs may perform cell reselection due to the coverage change (e.g., be handed-over to a second network entity) and may pay extra latency and power consumption costs to reacquire the updated SI (e.g., make extra measurements due to low mobility, reevaluate detected or measured cells for reselection, and execute the reselection). Further, the timing of the coverage area reduction may be ambiguous, and the first network entity may reduce the coverage area prior to all of the reselecting UEs reacquiring the updated SI. Thus, techniques which support optimizing the UE reaction to receiving a SI update may reduce overall power consumption and improve user experience.

In some examples, a wireless communications system may support one or more techniques to increase the efficiency for receiving an SI update. In some cases, the network entity may include additional information in an SI update indication that idle or inactive UEs may use to determine whether to wake up to receive updated SI, or whether to skip receiving the updated SI. For instance, the extended SI update may indicate which UEs are to reacquire the SI (e.g., based on respective SS-RSRP measurements), parameters relating to cell selection and reselection, an indication that the coverage area is changing, or any combination thereof. Additionally or alternatively, to mitigate the power consumption of one or more UEs that will perform reselection (e.g., no longer located in the reduced coverage area), the SI update may indicate a list of candidate neighboring network entities that are available for reselection. For instance, the list of candidate neighboring network entities may be preconfigured, or may depend on one or more UE parameters (e.g., beam direction). In some cases, the SI indication may provide parameters for candidate neighboring network entities (e.g., updated SSB transmission power, new threshold values, and the like), an updated whitelist and blacklist of neighboring wireless cells, or both. Further, the SI update indication may be extended to provide timing information regarding changes or transitions at the network entity. For instance, the update SI indication may inform UEs of when the network entity will change (e.g., shut down coverage, bar access, change coverage, change transmission power, and the like), and may include information about the power ramping (e.g., if such changes are gradual).

Aspects of the disclosure are initially described in the context of wireless communications systems. Aspects of the disclosure are further described with respect to a wireless communications system illustrating a network entity modifying an associated coverage region and a process flow diagram. Aspects of the disclosure are further illustrated by and described with reference to apparatus diagrams, system diagrams, and flowcharts that relate to coverage adaptation and impact on idle UE.

FIG. 1 illustrates an example of a wireless communications system 100 that supports coverage adaptation and impact on idle UE in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support coverage adaptation and impact on idle UE as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and N f may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more sub-bands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

In some wireless communications systems (e.g., wireless communications system 100) a first network entity 105 may modify a first associated coverage region to support network energy savings (e.g., reduce the first coverage area) or to compensate for an adjacent network entity 105 reducing a respective coverage area (e.g., expand the first coverage area). In some cases, one or more inactive or idle UEs 115 located within the modified coverage area may be woken up to receive a system information update indication notifying the inactive or idle UEs 115 of the change in coverage area. In some cases, one or more of the inactive or idle UEs 115 may be unaffected by the change in coverage (e.g., remain located within the adjusted coverage region) and may use wake up unnecessarily to receive updated system information. Additionally or alternatively, one or more of the inactive or idle UEs that will perform reselection (e.g., perform future communications with a second network entity 105) may make additional measurements to select the correct second network entity 105, thereby consuming unnecessary power.

In some cases, the first network entity 105 may transmit an updated system information update indication to provide the inactive or idle UEs 115 with more information that the UEs 115 may use to determine whether the UEs 115 are to wake up to receive an updated system information message, or whether the UEs 115 can ignore the updated system information message. For instance, the system information update indication may be extended to indicate one or more SS-RSRP thresholds associated with the modified coverage area. Further, the system information update indication may schedule a PDSCH notifying UEs 115 of candidate cells available for reselection. Additionally or alternatively, the system information update indication may provide the UEs 115 with timing information related to changes to the coverage area associated with the first network entity 105.

Figure 2:
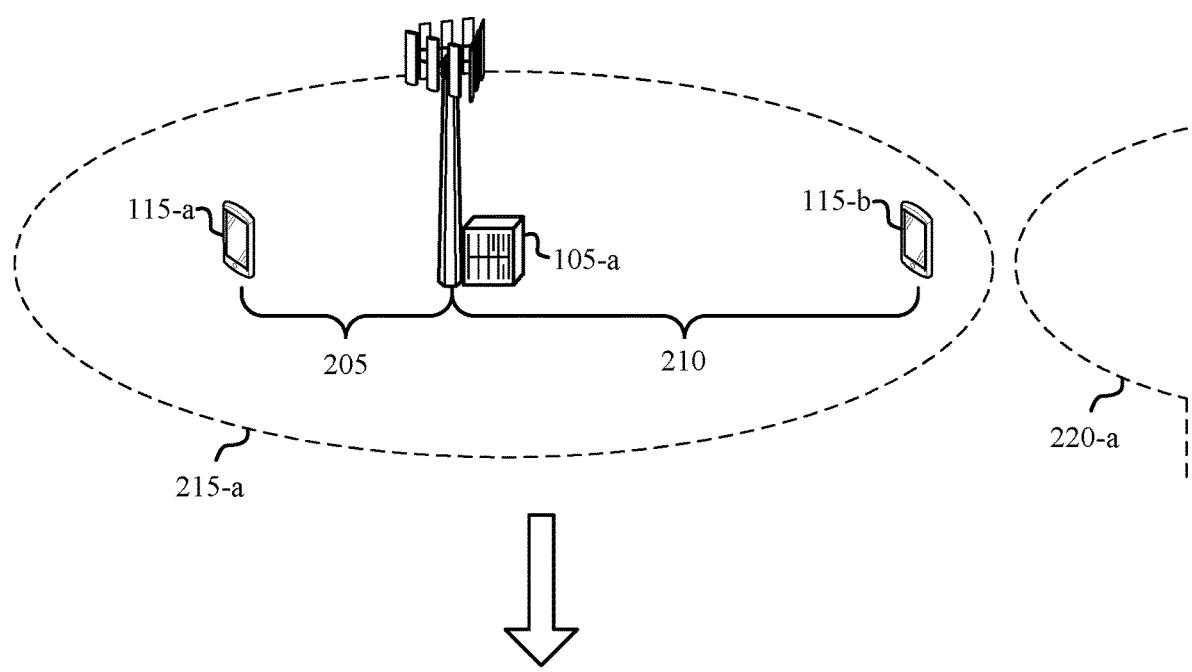
Figure 2:
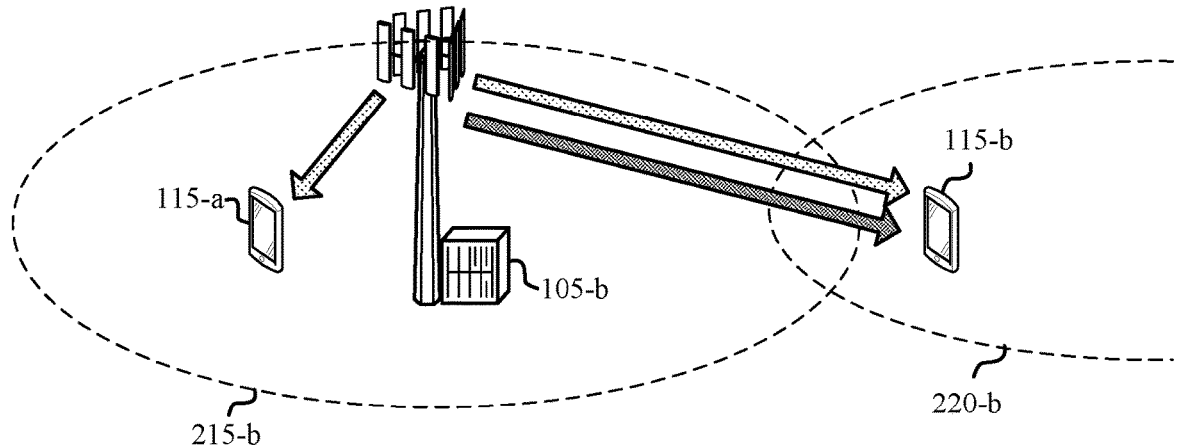

FIG. 2 illustrates an example of a wireless communications system 200 that supports coverage adaptation and impact on idle UE in accordance with one or more aspects of the present disclosure. In some examples, the wireless communications system 200 may implement aspects of wireless communications system 100. For example, the wireless communications system 200 may include one or more network entities 105 (e.g., a network entity 105-a and a network entity 105-b) and one or more UEs (e.g., a UE 115-a and a UE 115-b), which may be examples of a network entity 105 and a UE 115, respectively, as described herein with reference to FIG. 1. Further, a respective geographic coverage area may be associated with and be configurable by each network entity 105 (e.g., a geographic coverage area 215 configured by the network entity 105-a and a geographic coverage area 220 configured by the network entity 105-b). In some examples, the network entities 105 may broadcast a system information update indication 225 to notify UEs 115 (e.g., the UE 115-a and the UE 115-b) within a modified geographic coverage area of changes to the system. Additionally or alternatively, the network entities 105 may transmit an updated system information signal 230 to one or more UEs based on techniques described herein.

In some cases, a network entity 105 may configure the size of an associated geographic coverage area (e.g., reduce or expand) to support a network energy savings mode. For instance, the network entity 105-a may identify minimal activity within the network (e.g., during non-peak hours), and may reduce the geographic coverage area 215 (e.g., modify coverage from geographic coverage area 215-a to geographic coverage area 215-b) to mitigate energy expenditure. In response to the reduction of geographic coverage area 215, one or more neighboring network entities 105 (e.g., the network entity 105-b) may expand an associated geographic coverage area (e.g., the geographic coverage area 220) to compensate for regions served by the initial geographic coverage area 215-a, but no longer served after the geographic coverage area 215-a is reduced (e.g., to the geographic coverage area 215-b).

In some examples, a network entity 105-a may configure a first set of antenna arrays (e.g., to support directional beamforming in a first spatial coverage area) and a second network entity 105-b may configure a second set of antenna arrays (e.g., to support directional beamforming in a second spatial coverage area) to support network energy savings. For example, the first network entity 105-a may reduce the first spatial coverage area to support network energy savings (e.g., deactivate one or more of the first set of antenna arrays) and the second network 105-b entity may increase the second spatial coverage area to compensate for the reduced first spatial coverage area (e.g., activate one or more deactivated antenna arrays).

In some examples, a network entity 105 changing a mode of operation (e.g., entering an energy saving mode, entering a compensation mode, returning to normal operations, and the like) may change one or more system parameters. For example, changing a mode of operation may change a synchronization-signal (SS) block (SSB) (e.g., carried in a system information (SI) block 1 (SIB1)), access control related information carried in a master information block (MIB) or SIB1 (e.g., whether the cell is barred or not), SS-thresholds for random access procedure (RACH) transmission (e.g., carried in a SIB1), cell selection criteria carried in a SIB1 (e.g., received power thresholds and quality thresholds), cell reselection criteria (e.g., thresholds for candidate cells, a whitelist, a blacklist, and the like, carried in any of SIB2, SIB3, or SIB4), or any combination thereof. When a first network entity 105 (e.g., the network entity 105-a) changes a mode of operation, one or more neighboring network entities 105 (e.g., the network entity 105-b) may update the content of an associated SIB2, a SIB3, a SIB4, or any combination thereof.

When the geographic coverage area 215 is reduced, the network entity 105-a may perform a hand-over procedure for one or more UEs 115. For example, the network entity 105-b may determine that a UE 115 (e.g., the UE 115-b) will no longer be located within the reduced geographic coverage area 215-b, and may indicate, to a neighboring network entity 105 (e.g., the network entity 105-b), that the UE 115 is to perform subsequent communications with the neighboring network entity 105. In some cases, one or more UEs 115 located within the initial geographic coverage area 215-a may be in an inactive or idle state. In this case, the network entity 105-a may not be aware of one or more of the inactive UEs 115, and thus may not perform a necessary hand-over procedure for an inactive UE 115 that is no longer located within the reduced coverage area 215-b (e.g., the UE 115-b). Thus, the network entity 105-a and the neighboring network entities 105 (e.g., the network entity 105-b) may broadcast a system information update indication 225 notifying and waking (e.g., for inactive or idle UEs 115) all UEs 115 within the respective geographic coverage areas of an upcoming updated system information signal 230 which includes updated system information based on the coverage change. In some cases, however, one or more inactive or idle UEs 115 which will not change coverage (e.g., the UE 115-a which remains located within the reduced coverage area 215-b), but may still wake up in response to the system information update indication 225, resulting in unnecessary power consumption.

In some cases, based on updated system information, one or more UEs 115 that will perform a reselection procedure (e.g., the UE 115-b which no longer remains located within the reduced geographic coverage area 215-b) may perform additional measurements to reacquire the updated system information signal 230 (e.g., if a low-mobility UE 115 performed relaxed neighbor cell measurements prior to the change in geographic coverage area 215), and may thus experience relatively significant latency and power consumption. Additionally or alternatively, the network entity 105-a may reduce the geographic coverage area 215 before all of the UEs 115 in the initial geographic coverage region 215-a have reacquired the updated system information signal 230, which may leave one or more of the UEs 115 without proper coverage. Additionally or alternatively, similar principles may be applied for a mobile cell, or a mobile relay such as a mobile integrated access and backhaul (IAB) node, which may reduce (e.g., make smaller or deactivate) an associated coverage region when in close proximity to a stationary cell node or another mobile cell node (e.g., the network entity 105-a).

In some cases, the network entity 105-a may extend the system information update indication 225 to include more information so that one or more inactive or idle UEs 115 which will not change coverage (e.g., the UE 115-a), may determine whether or not to receive the updated system information message. In some other examples, if the inactive or idle UEs 115 remaining within the reduced geographic coverage region 215-b are associated with different beam directions, the network entity 105-a may configure the system information update indication 225 to be sent in relevant directions (e.g., away from the beam directions associated with the UEs 115 that should not reacquire the updated system information signal 225).

Additionally or alternatively, the network entity 105-a may identify that the inactive or idle UEs 115 are associated with different coverage distances (e.g., different reference signal received power (RSRP) thresholds), and may extend the system information update indication 225 to provide an indication of which UEs 115 are to reacquire the updated system information signal 230 (e.g., based on a measured synchronization signal (SS) RSRP at each of the UEs 115). For example, the network entity 105-a may provide, via the extended system information update indication 225, a mapping that associates a respective SS-RSRP threshold to one or more geographic coverage areas (e.g., the geographic coverage area 215, the geographic coverage area 220, or both). In some cases, the SS-RSRP mapping may be indicated via reserved bits in the system information update indication 225 (e.g., a short message in a downlink control information (DCI)), or via a semi-static indication (e.g., a SIB1 mapping bits to different RSRP thresholds, different geographic coverage regions, or both). Additionally or alternatively, the indication may be signaled by a paging early indication (PEI) physical downlink control channel (PDCCH).

In some cases, the UEs 115 located within the initial geographic coverage area 215-a (e.g., the UE 115-a and the UE 115-b) may measure a respective SS-RSRP and compare the measured value to the indicated threshold. For example, the UE 115-a may be located at a first distance 205 from the network entity, and the UE 115-b may be located at a second distance 210 from the network entity, the first distance 205 being shorter than the second distance 210. Accordingly, the SS-RSRP measured by the UE 115-a may be above the SS-RSRP threshold indicated by the system information update indication 225, and the SS-RSRP measured by the UE 115-b may be below the SS-RSRP threshold indicated by the system information update indication 225. In this case, the UE 115-a may, based on measuring a SS-RSRP above the indicated threshold mapped to the geographic coverage area 215, determine to skip receiving the upcoming updated system information signal 230 and return to an inactive or idle state to support power savings, and the UE 115-b may, based on measuring a SS-RSRP below the indicated threshold mapped to the geographic coverage area 215, determine to receive the upcoming updated system information signal 230, as illustrated in FIG. 2.

Additionally or alternatively, the network entity 105-a may configure one or more target groups based on a RSRP threshold. For instance, the network entity 105-a may indicate that the UE 115-a is part of a group of UEs 115 that are to skip receiving the updated system information signal 230 based on the SS-RSRP measured at the UE 115-a being above the threshold mapped to the geographic coverage area 215, and that the UE 115-b is part of a group of UEs 115 that are to receive the updated system information signal 230 based on the SS-RSRP measured at the UE 115-b being below the threshold mapped to the geographic coverage area 215. Further, the targeted groups may be based on a mobility state associated with each UE 115 (e.g., a high mobility UE 115 group, a low mobility UE 115 group, or both). In some examples, the network entity 105-a may schedule a physical downlink shared channel (PDSCH) via a PDCCH (e.g., carrying the system information update indication 225). The scheduled PDSCH may carry information indicating which UEs 115 (e.g., within the geographic coverage area 215) are to reacquire the updated system information signal 230 based on the associated RSRP threshold.

In some other cases, the network entity 105-a may extend the system information update indication 225 to indicate that the system changes are related to cell selection parameters, cell reselection parameters, or both (e.g., indicating that UEs 115 that will not perform cell selection or cell reselection can skip receiving the updated system information signal 230). Additionally or alternatively, the network entity 105-a may extend the system information update indication 225 to indicate that the network entity 105-a is going to change a mode of operation (e.g., deactivate, reduce the associated geographic coverage region 215, extend the associated geographic coverage region 215, or otherwise change coverage regions). In this case, the network entity 105-a may, prior to transmitting the system information update indication, transmit a semi-static indication (e.g., via system information or dedicated radio resource control (RRC) signaling) of one or more configurations (e.g., transmission power, RSRP thresholds, etc.) associated with different modes of operations.

In some examples, one or more UEs 115 may no longer be located in the reduced geographic coverage area 215-b based on the coverage change (e.g., the UE 115-b), and may perform a cell reselection procedure to determine a new network entity 105 (e.g., the network entity 105-b associated with the geographic coverage area 220) with which to perform subsequent communications. For instance, after receiving the system information update indication 225, the UE 115-b may determine, based on a measured SS-RSRP and the RSRP threshold mapped to the geographic coverage area 215, to receive the updated system information signal 230 and perform cell reselection.

In order to reduce power consumption and reduce excess measurements associated with the cell reselection procedure, the network entity 105-a may indicate, to the UE 115-b, updated portions of the updated system information signal 230 directly via a PDSCH (e.g., the PDSCH scheduled by the system information update indication 225). For example, the UE 115-b may identify, via the PDSCH, a list of candidate neighboring cells that are available for reselection by the UE 115-b (e.g., due to the reduction of the geographic coverage area 215). The list of candidate neighboring cells may be preconfigured, or may be different for different beam directions associated with the UEs 115 (e.g., different information sent by the PDSCH for different beam directions). In some cases, the PDSCH indication may provide one or more parameters associated with the candidate neighboring cells (e.g., an updated SSB transmission power, new thresholds, and the like) to assist in the reselection procedure. Additionally or alternatively, an updated whitelist (e.g., cells approved for reselection) or an updated blacklist (e.g., cells unapproved for reselection) may be provided by the PDSCH indication.

In some cases, to prevent one or more UEs 115 (e.g., the UE 115-b) from losing coverage due to the network entity 105-a reducing the geographic coverage area 215 before the one or more UEs 115 have reacquired the updated system information signal 230, the one or more UEs 115 may receive timing information regarding an upcoming change in the system. For instance, a PDSCH (e.g., scheduled by the PDCCH carrying the system information update indication 225) may indicate, to the UE 115-b, timing information (e.g., relative or absolute, in terms of system frame number (SFN)) corresponding to when the network entity 105-a will implement a system change or transition to a new mode. The system change or transition may be an example of shutting down coverage (e.g., deactivating), barring access, reducing or increasing coverage (e.g., reducing the geographic coverage area 215 or expanding the geographic coverage area 220), changes an associated transmission power, or any combination thereof. Further, the network entity 105-a may scramble the PDSCH via a paging radio network temporary identifier (P-RNTI) or another RNTI defined for the purpose of scrambling the PDSCH. In some cases, the network entity 105-a may perform a change in coverage (e.g., changing the initial geographic coverage area 215-a to the reduced geographic coverage area 215-b) or a change in transmission power gradually. In this case, the PDSCH may be updated to include information related to power ramping to notify the UE 115-b of the duration of the change.

Figure 3:
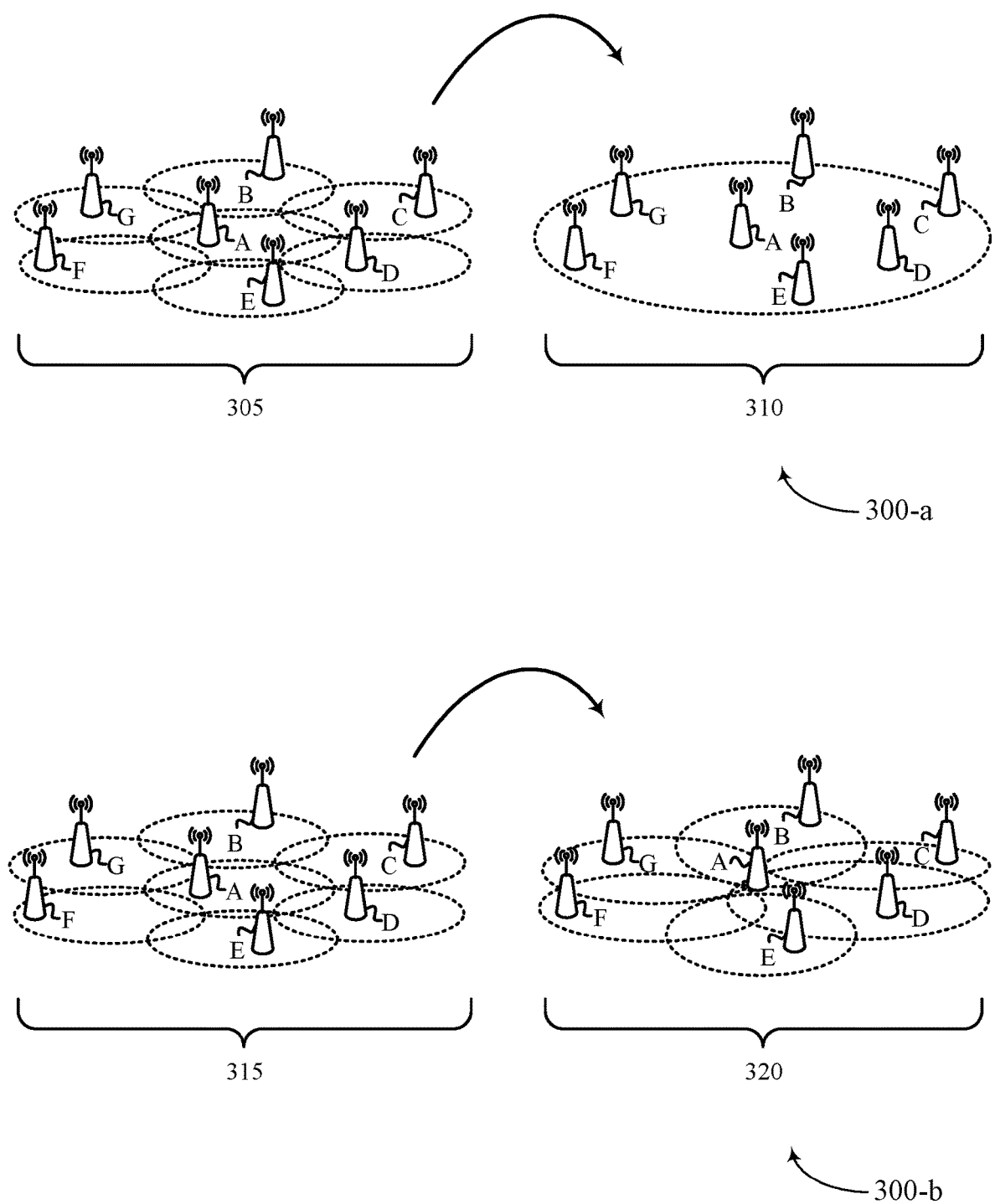
FIG. 3 illustrates example wireless network modification configurations that support coverage adaptation and impact on idle UE in accordance with one or more aspects of the present disclosure.

FIG. 3 illustrates an example of wireless network modification configurations 300-a and 300-b that support coverage adaptation and impact on idle UE in accordance with one or more aspects of the present disclosure. For example, wireless network modification configurations may show various network entities A, B, C, D, E, F, and G, which may be examples of corresponding network entities 105 described with reference to FIGS. 1 and 2.

At 305, a wireless network 300-a may include network entities A through G, each network entity serving a corresponding geographical coverage region or cell within the wireless network 300-a. The network entities B through G may enter into an energy conservation mode, and may deactivate at least a portion of their served coverage area. In such examples, the network entity A may enter into a compensation mode at 310 and may expand its associated coverage area to effectively extend coverage for the devices served by network entities B through G during power saving.

At 315, a wireless network 300-b may include network entities A through G, each network entity serving a corresponding geographical coverage region or cell within the wireless network 300-b. The network A may enter into an energy conservation mode, and may deactivate at least a portion of its served coverage area. In such examples, the network entities B through G may enter into a compensation mode at 320 and may expand their associated coverage area to effectively extend coverage for the devices served by network entity A during power saving.

In some cases, one or more inactive or idle wireless devices located within the coverage areas may be woken up to receive a system information update indication to notify the devices of a change in coverage area in a power saving mode. In some cases, one or more of the inactive or idle UEs may be unaffected by the change in coverage, and may wake up unnecessarily to receive updated system information. In some examples, however, network entities A through G may transmit an updated system information update indication to provide the inactive or idle devices with more information that the devices may use to determine whether to wake up to receive updated system information, or whether to remain in an idle or inactive mode to conserve power.

Figure 4:
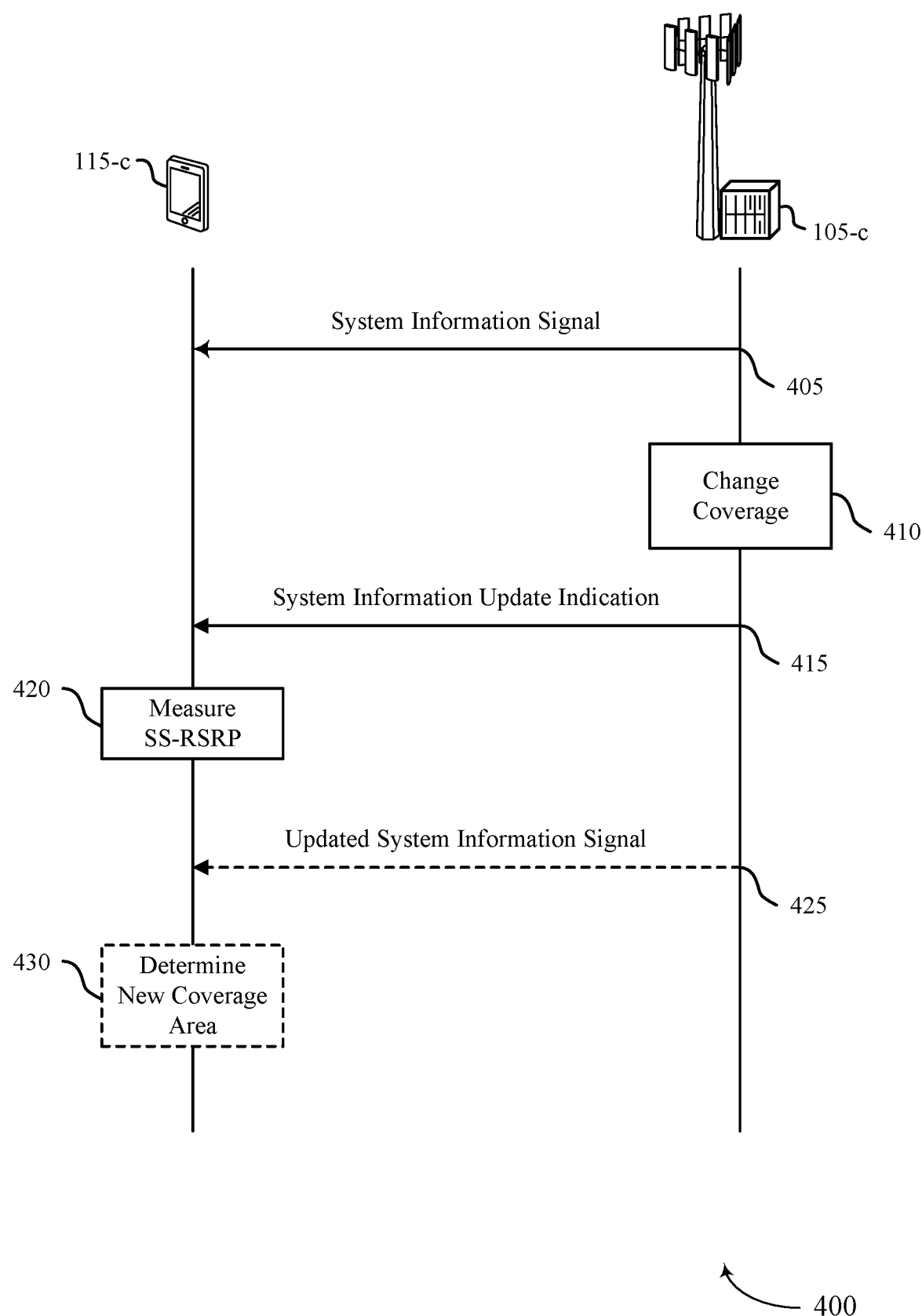
FIG. 4 illustrates an example of a process flow that supports coverage adaptation and impact on idle UE in accordance with one or more aspects of the present disclosure.

FIG. 4 illustrates an example of a process flow 400 that supports coverage adaptation and impact on idle UE in accordance with one or more aspects of the present disclosure. that supports coverage adaptation and impact on idle UE in accordance with one or more aspects of the present disclosure. The process flow 400 may be implemented by a network entity 105-c and a UE 115-c, which may be examples of a network entity 105-a and a UE 115 (e.g., a UE 115-a or a UE 115-b) as described with respect to FIG. 2. In some examples, some signaling or procedure of the process flow 400 may occur in different orders than shown. Additionally or alternatively, some additional procedures of signaling may occur, some procedures may occur in different orders shown, or some signaling or procedures may be omitted.

At 405, the network entity 105-c may communicate with the UE 115-c within a first coverage area associated with a first wireless cell. In some cases, the network entity 105-c may transmit system information signaling which may include procedural communications between the network entity 105-c and the UE 115-c prior to a change in the coverage area performed by the network entity 105-c. The UE 115-c may determine an initial state of system information via the system information signal.

At 410, the network entity 105-c may determine to change a coverage area associated with the network entity 105-c. For example, the network entity 105-c may identify low activity or mobility within the associated coverage area (e.g., a geographic coverage area, a spatial coverage area, or both), and may determine to reduce the associated coverage region to support an energy savings mode. Additionally or alternatively, the network entity 105-c may determine to increase the associated coverage region to compensate for a neighboring network entity 105 reducing an associated coverage area (e.g., to support network energy savings). The modification of the associated coverage region may indicate a deactivation of at least a portion of the network entity 105-c, an activation of at least a portion of the network entity 105-c, a change in the associated coverage area, or any combination thereof.

At 415, the network entity 105-c may transmit, to the UE 115-c, a system information update signal based on identifying the change in the associated coverage area. For example, the system information update indication may indicate, to the UE 115-c, that a first coverage area (e.g., which the UE 115-c is located within) is modified to a second coverage area different from the first coverage area (e.g., expanded or reduced). In some cases, the network entity 105-c may transmit system information update indication in a system information block or via a paging early indication-physical downlink control channel.

In some cases, the system information update indication may provide a mapping that associates a synchronization signal-reference signal received power (SS-RSRP) threshold to one or more coverage areas. For example, the system information update indication may include one or more bits mapping a SS-RSRP threshold to the first coverage area or the second coverage area. In some examples, the mapping may indicate one or more UE groups that are associated with different SS-RSRP power thresholds, different UE mobility states, or any combination thereof. Additionally or alternatively, the system information update indication may include a timing threshold indicative of timing information for the change in coverage area. For example, the timing threshold may indicate a time at which the UE 115-c is scheduled to receive an updated system information signal, a time at which the network entity 105-c restricts access for the UE 115-c, enables access for the UE 115-c, changes a relative transmission power, or any combination thereof. In some cases, the timing threshold may include a relative timing threshold or an absolute timing threshold based on the modification of the coverage area. For instance, the timing threshold may be indicated in terms of system frame number, which may be compared to an absolute timing or system-relative timing. Further, the timing threshold may include a timing interval for a transition of coverage area, which may provide cell coverage transition information, power ramping information, or both, to apply during the coverage area transition. The network entity 105-c may communicate the timing threshold via a downlink shared channel scheduled by a downlink control channel, which may be scrambled by a radio network temporary identifier associated with an updated system information signal.

At 420, the UE 115-c may measure a SS-RSRP based on receiving the system information update indication. For example, the UE 115-c may identify a SS-RSRP threshold associated with the initial geographic coverage region and a SS-RSRP threshold associated with the reduced geographic coverage area. Accordingly, the UE 115-c may measure an SS-RSRP and compare the measured value to the one or more threshold values. In some cases, the UE 115-c may determine to skip receiving the upcoming updated system information signal due to the measured SS-RSRP value being higher than the threshold indicated by the system information update indication. Additionally or alternatively, the UE 115-c may determine to receive the upcoming updated system information signal due to the measured SS-RSRP value being lower than the threshold indicated by the system information update indication.

At 425, the UE 115-c may determine whether to receive, from the network entity 105-c, an updated system information signal based on one or more thresholds such as the SS-RSRP threshold and associated SS-RSRP measured at the UE 115-c. For example, the network entity 105-c may transmit the updated system information signal to the UE 115-c after the UE 115-c determines to receive the updated system information signal due to measuring a SS-RSRP below a threshold indicated by the system information update indication. In some cases, the UE 115-c may identify a list of one or more adjacent network entities 105 that are available for reselection based on receiving the updated system information signal. For example, the updated portion of the system information may be directly indicated via a downlink shared channel scheduled by the system information update signal. The UE 115-c may then identify the list of candidate neighboring network entities 105 indicated by the system information update signal. Additionally or alternatively, the list of one or more adjacent network entities 105 may indicate a set of restricted cells being unavailable for reselection by the UE 115-c. In some cases, the list of candidate neighboring network entities 105 may be based on one or more beam directions associated with the network entity 105-c. Additionally or alternatively, the updated system information signal may indicate a change in SS transmission power at the network entity 105-c.

At 430, the UE 115-c may optionally determine a new coverage area for subsequent communications. For example, if the UE 115-c determined to receive the updated system information signal due to measuring a SS-RSRP value below the indicated threshold associated with the reduced geographic coverage area, the UE 115-c may identify a new network entity 105 (e.g., from the list of one or more candidate neighboring network entities 105) with which to perform future communications. In some cases, the UE 115-c may not determine a new coverage area due to determining to skip receiving the updated system information signal (e.g., due to measuring an SS-RSRP value above the indicated threshold associated with the reduced geographic coverage area).

Figure 5:
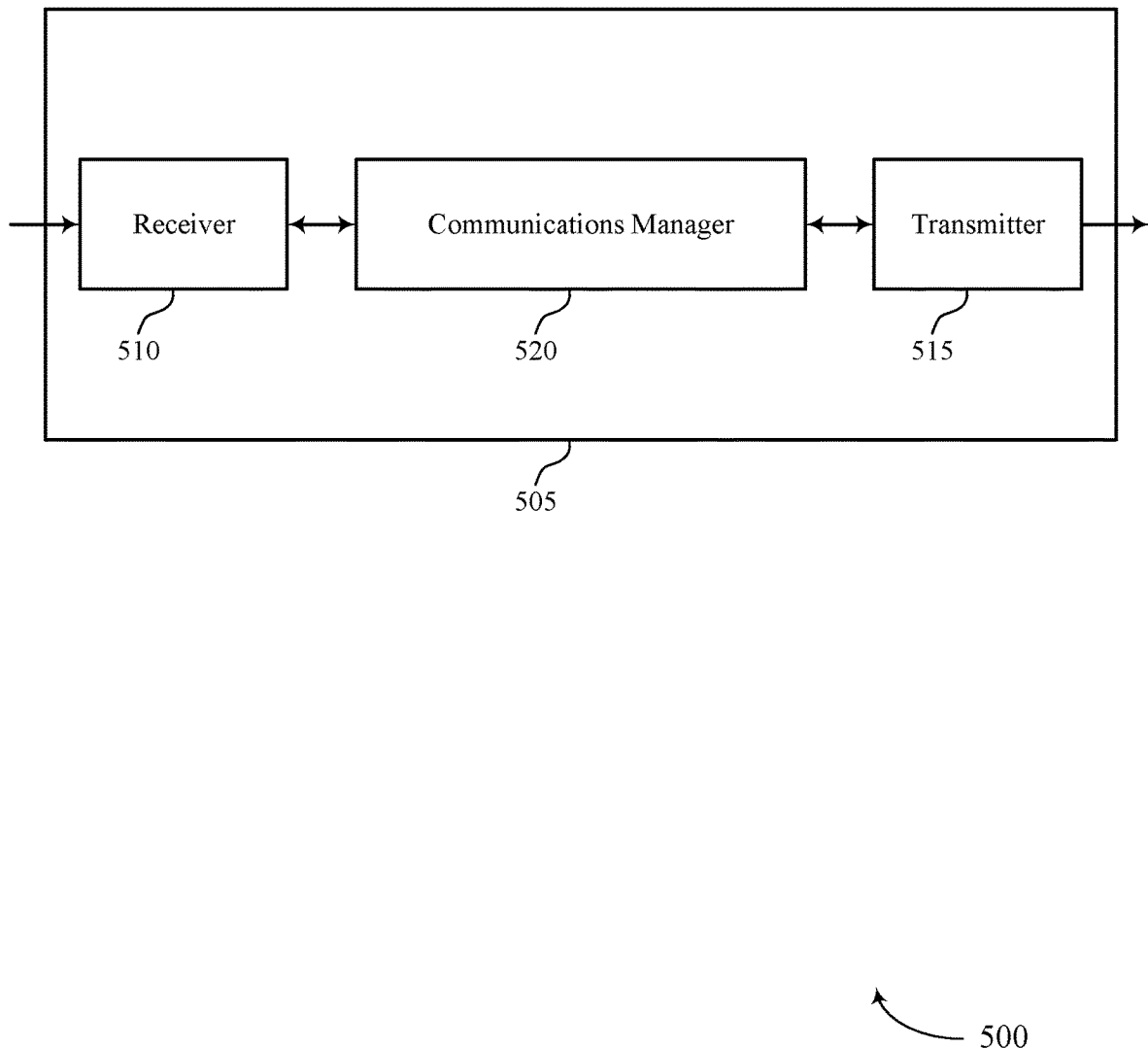
FIGS. 5 and 6 show block diagrams of devices that support coverage adaptation and impact on idle UE in accordance with one or more aspects of the present disclosure.

FIG. 5 shows a block diagram 500 of a device 505 that supports coverage adaptation and impact on idle UE in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to coverage adaptation and impact on idle UE). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to coverage adaptation and impact on idle UE). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of coverage adaptation and impact on idle UE as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication at a UE in accordance with examples as disclosed herein. For example, the communications manager 520 may be configured as or otherwise support a means for communicating with a network entity within a first coverage area associated with a first wireless cell. The communications manager 520 may be configured as or otherwise support a means for receiving a system information update indication that indicates a modification of the first coverage to a second coverage area associated with the first wireless cell, and one or more thresholds indicating whether the UE is to receive an updated system information message associated with the modification of the first coverage area to the second coverage area of the first wireless cell, or whether the UE is to skip receiving the updated system information message associated with the modification of the first coverage area to the second coverage area of the first wireless cell. The communications manager 520 may be configured as or otherwise support a means for determining whether to receive the updated system information message based on the one or more thresholds.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for reduced power consumption and increased power savings, more efficient utilization of system information signaling, and reduced time spent switching between idle or inactive states and active states of a device.

Figure 6:
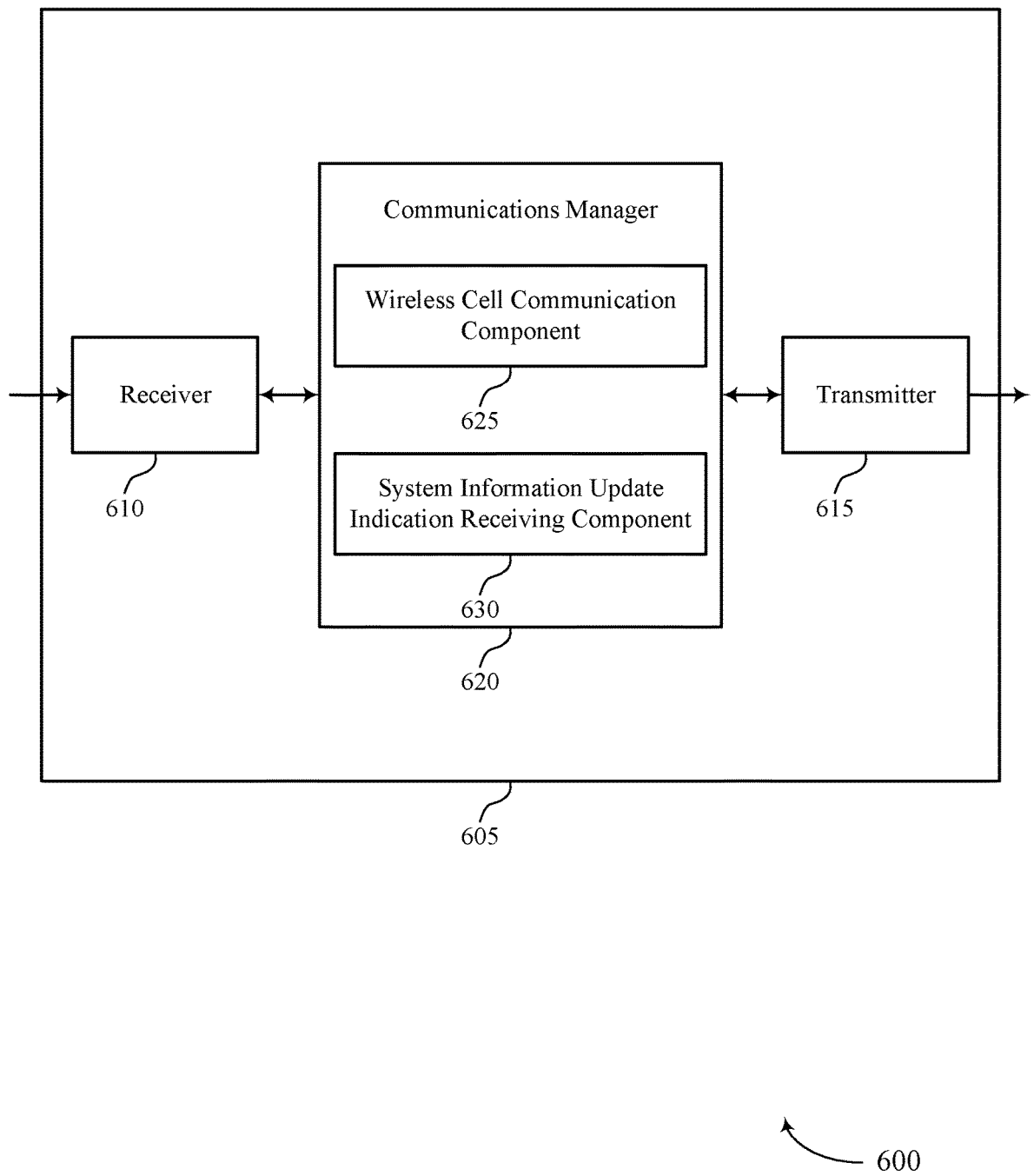

FIG. 6 shows a block diagram 600 of a device 605 that supports coverage adaptation and impact on idle UE in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to coverage adaptation and impact on idle UE). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to coverage adaptation and impact on idle UE). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of coverage adaptation and impact on idle UE as described herein. For example, the communications manager 620 may include a wireless cell communication component 625 a system information update indication receiving component 630, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a UE in accordance with examples as disclosed herein. The wireless cell communication component 625 may be configured as or otherwise support a means for communicating with a network entity within a first coverage area associated with a first wireless cell. The system information update indication receiving component 630 may be configured as or otherwise support a means for receiving a system information update indication that indicates a modification of the first coverage to a second coverage area associated with the first wireless cell, and one or more thresholds indicating whether the UE is to receive an updated system information message associated with the modification of the first coverage area to the second coverage area of the first wireless cell, or whether the UE is to skip receiving the updated system information message associated with the modification of the first coverage area to the second coverage area of the first wireless cell. The system information update indication receiving component 630 may be configured as or otherwise support a means for determining whether to receive the updated system information message based on the one or more thresholds.

Figure 7:
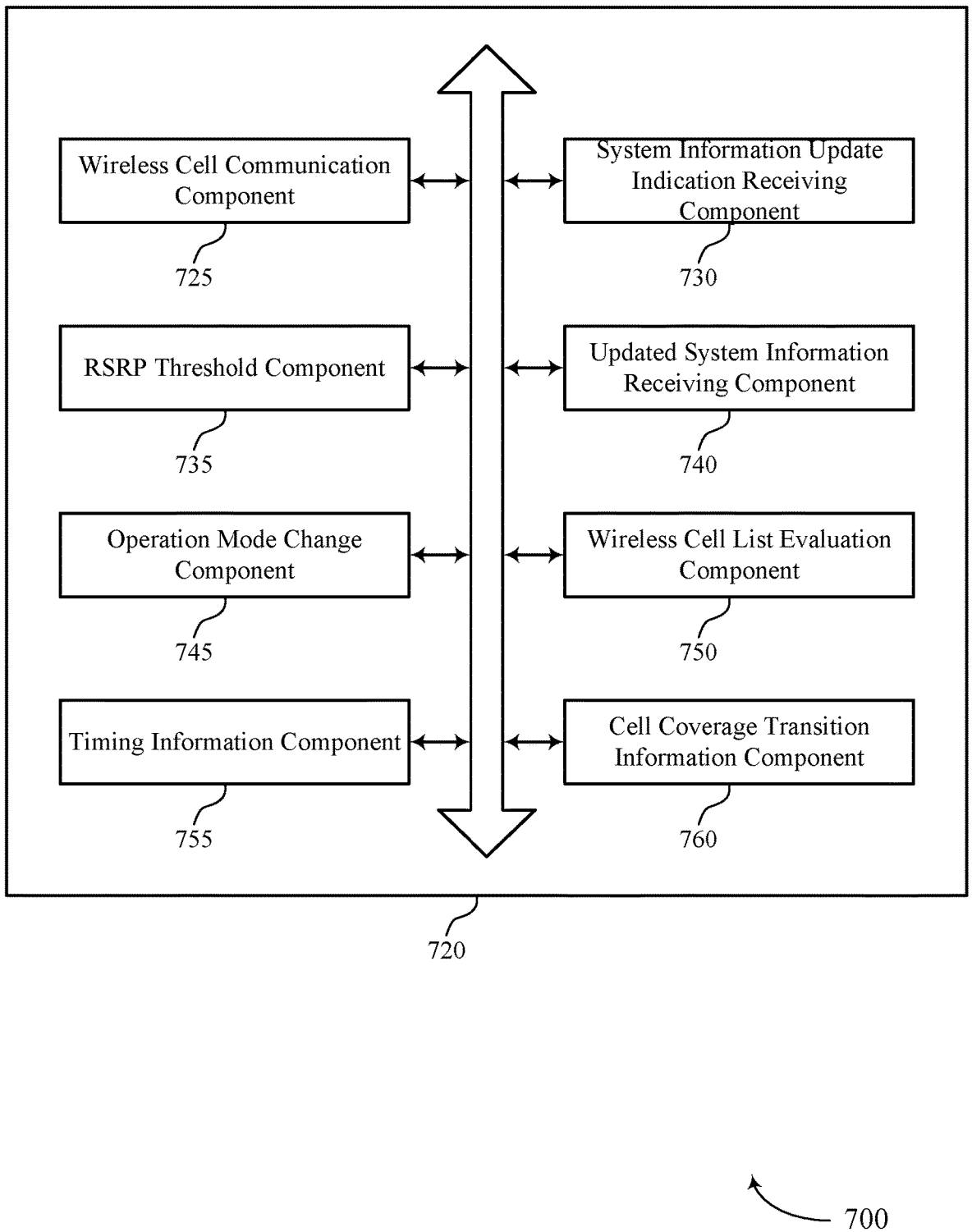
FIG. 7 shows a block diagram of a communications manager that supports coverage adaptation and impact on idle UE in accordance with one or more aspects of the present disclosure.

FIG. 7 shows a block diagram 700 of a communications manager 720 that supports coverage adaptation and impact on idle UE in accordance with one or more aspects of the present disclosure. The communications manager 720 may be an example of aspects of a communications manager 520, a communications manager 620, or both, as described herein. The communications manager 720, or various components thereof, may be an example of means for performing various aspects of coverage adaptation and impact on idle UE as described herein. For example, the communications manager 720 may include a wireless cell communication component 725, a system information update indication receiving component 730, an RSRP threshold component 735, an updated system information receiving component 740, an operation mode change component 745, a wireless cell list evaluation component 750, a timing information component 755, a cell coverage transition information component 760, or any combination thereof. Each of these components may communicate, directly or indirectly, with one another (e.g., via one or more buses).

The communications manager 720 may support wireless communication at a UE in accordance with examples as disclosed herein. The wireless cell communication component 725 may be configured as or otherwise support a means for communicating with a network entity within a first coverage area associated with a first wireless cell. The system information update indication receiving component 730 may be configured as or otherwise support a means for receiving a system information update indication that indicates a modification of the first coverage to a second coverage area associated with the first wireless cell, and one or more thresholds indicating whether the UE is to receive an updated system information message associated with the modification of the first coverage area to the second coverage area of the first wireless cell, or whether the UE is to skip receiving the updated system information message associated with the modification of the first coverage area to the second coverage area of the first wireless cell. In some examples, the system information update indication receiving component 730 may be configured as or otherwise support a means for determining whether to receive the updated system information message based on the one or more thresholds.

In some examples, the one or more thresholds include a synchronization signal-reference signal receive power threshold, and the RSRP threshold component 735 may be configured as or otherwise support a means for receiving, in one or more bits of the system information update indication, a mapping that associates the synchronization signal-reference signal receive power threshold to the first coverage area or the second coverage area. In some examples, the one or more thresholds include a synchronization signal-reference signal receive power threshold, and the updated system information receiving component 740 may be configured as or otherwise support a means for receiving the updated system information based on a measured synchronization signal-reference signal receive power at the UE being less than the synchronization signal-reference signal receive power threshold in accordance with the mapping.

In some examples, the system information update indication receiving component 730 may be configured as or otherwise support a means for receiving the system information update indication via a short message in a paging PDCCH or via a paging early indication-physical downlink control channel.

In some examples, the mapping indicates one or more UE groups that are associated with different synchronization signal-reference signal receive power thresholds, and the RSRP threshold component 735 may be configured as or otherwise support a means for determining, in accordance with the mapping, that the UE is part of a UE group of the one or more UE groups that is to receive the updated system information message based on the synchronization signal-reference signal receive power threshold. In some examples, the mapping indicates one or more UE groups that are associated with different synchronization signal-reference signal receive power thresholds, and the updated system information receiving component 740 may be configured as or otherwise support a means for receiving the updated system information message based on the determining.

In some examples, the mapping is further based on a mobility state of the UE.

In some examples, the mapping indicates one or more UE groups that are associated with different synchronization signal-reference signal receive power thresholds, and the system information update indication receiving component 730 may be configured as or otherwise support a means for receiving the system information update indication via a downlink control channel. In some examples, the mapping indicates one or more UE groups that are associated with different synchronization signal-reference signal receive power thresholds, and the RSRP threshold component 735 may be configured as or otherwise support a means for receiving the mapping via a downlink shared channel scheduled by the downlink control channel. In some examples, the mapping indicates one or more UE groups that are associated with different synchronization signal-reference signal receive power thresholds, and the updated system information receiving component 740 may be configured as or otherwise support a means for receiving the updated system information message based on the mapping.

In some examples, the system information update indication further includes one or more cell selection parameters associated with the updated system information message.

In some examples, the operation mode change component 745 may be configured as or otherwise support a means for receiving a control message that indicates a change in one or more modes of operation associated with the modification of the first coverage area to the second coverage area of the first wireless cell.

In some examples, the modification of the first coverage area to the second coverage area of the first wireless cell indicates a deactivation of at least a portion of the first wireless cell, an activation of at least a portion of the first wireless cell, a change in coverage of the first wireless cell, or any combination thereof.

In some examples, the one or more thresholds include one or more coverage change thresholds, and the wireless cell list evaluation component 750 may be configured as or otherwise support a means for receiving a list of one or more adjacent wireless cells different from the first wireless cell as part of the updated system information message, the one or more adjacent wireless cells being available for re-selection by the UE based on the coverage change of the first wireless cell satisfying the one or more coverage change thresholds.

In some examples, the list of one or more adjacent wireless cells is based on one or more beam directions associated with the first wireless cell.

In some examples, the updated system information message further indicates a change in synchronization signal transmission power associated with the first wireless cell.

In some examples, the list of one or more adjacent wireless cells further indicates a set of restricted cells being unavailable for re-selection by the UE based on the coverage change of the first wireless cell.

In some examples, the one or more thresholds include a timing threshold indicative of timing information for a time in which the modification of the first coverage area to the second coverage area of the first wireless cell is to occur, and the timing information component 755 may be configured as or otherwise support a means for determining whether to receive the updated system information message based on a time that the UE is scheduled to receive the updated system information message satisfying the timing threshold.

In some examples, the timing information component 755 may be configured as or otherwise support a means for receiving the timing threshold indicative of the timing information via a downlink shared channel scheduled by a downlink control channel, the downlink control channel scrambled by a radio network temporary identifier associated with the updated system information message.

In some examples, the timing threshold is further indicative of a time in which the first wireless cell restricts access for the UE, enables access for the UE, changes relative transmission power, or any combination thereof.

In some examples, the timing threshold includes a relative timing threshold or an absolute timing threshold based on the modification of the first coverage area to the second coverage area of the first wireless cell.

In some examples, the timing threshold includes a timing interval for a transition the first coverage area to the second coverage area of the first wireless cell, and the cell coverage transition information component 760 may be configured as or otherwise support a means for receiving cell coverage transition information, power ramping information, or both, to apply during the transition the first coverage area to the second coverage area.

Figure 8:
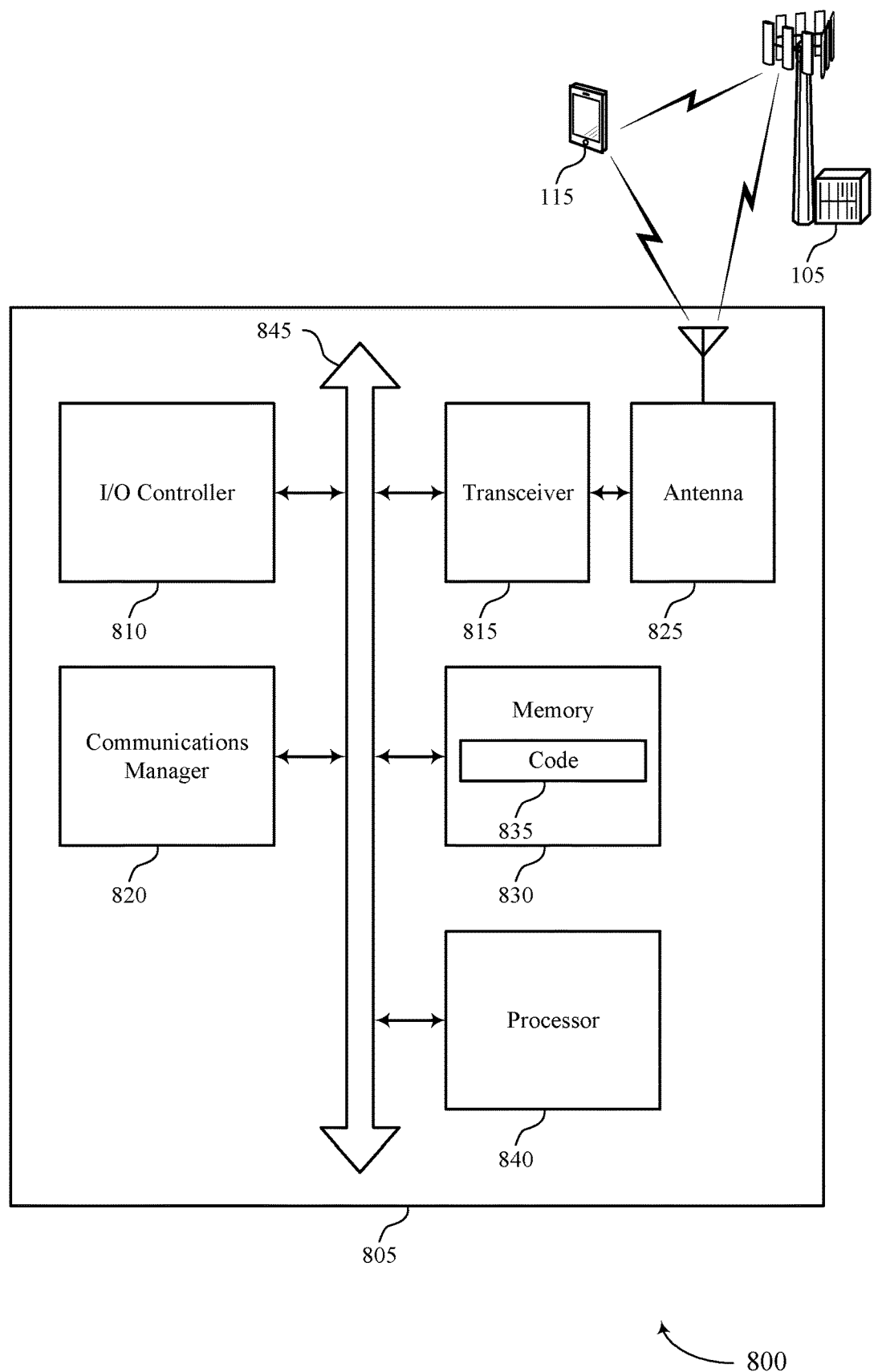
FIG. 8 shows a diagram of a system including a device that supports coverage adaptation and impact on idle UE in accordance with one or more aspects of the present disclosure.

FIG. 8 shows a diagram of a system 800 including a device 805 that supports coverage adaptation and impact on idle UE in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting coverage adaptation and impact on idle UE). For example, the device 805 or a component of the device 805 may include a processor 840 and memory 830 coupled with or to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for communicating with a network entity within a first coverage area associated with a first wireless cell. The communications manager 820 may be configured as or otherwise support a means for receiving a system information update indication that indicates a modification of the first coverage to a second coverage area associated with the first wireless cell, and one or more thresholds indicating whether the UE is to receive an updated system information message associated with the modification of the first coverage area to the second coverage area of the first wireless cell, or whether the UE is to skip receiving the updated system information message associated with the modification of the first coverage area to the second coverage area of the first wireless cell. The communications manager 820 may be configured as or otherwise support a means for determining whether to receive the updated system information message based on the one or more thresholds.

By including or configuring the communications manager 820 in accordance with examples as described herein, the device 805 may support techniques for improved communication reliability, improved user experience related to reduced battery usage and more efficient handover, reduced power consumption and increased power savings, more efficient utilization of communication resources, improved coordination and system information signaling between devices, longer battery life.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of coverage adaptation and impact on idle UE as described herein, or the processor 840 and the memory 830 may be otherwise configured to perform or support such operations.

Figure 9:
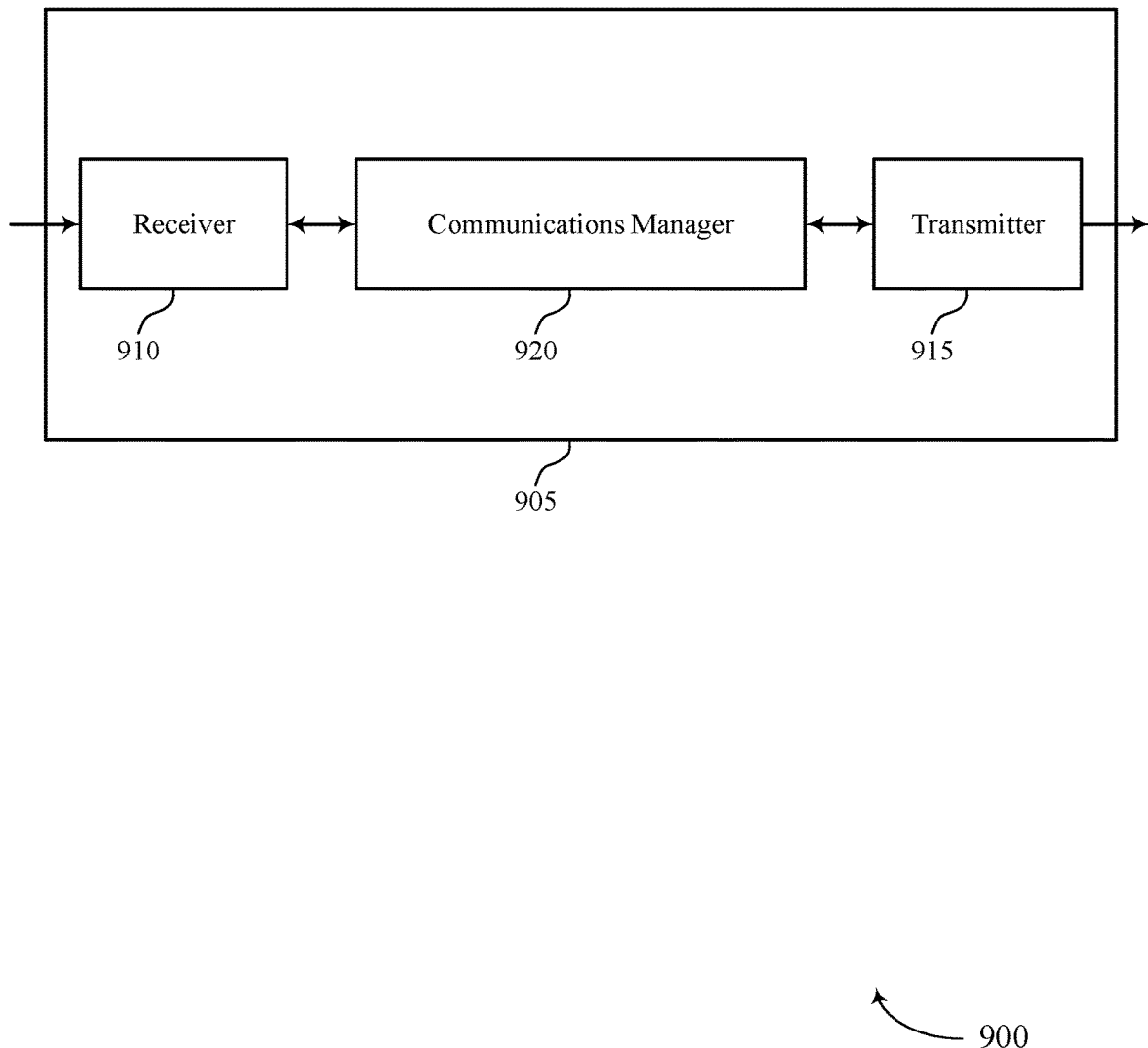
FIGS. 9 and 10 show block diagrams of devices that support coverage adaptation and impact on idle UE in accordance with one or more aspects of the present disclosure.

FIG. 9 shows a block diagram 900 of a device 905 that supports coverage adaptation and impact on idle UE in accordance with one or more aspects of the present disclosure. The device 905 may be an example of aspects of a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of coverage adaptation and impact on idle UE as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a network entity in accordance with examples as disclosed herein. For example, the communications manager 920 may be configured as or otherwise support a means for communicating with a UE within a first coverage area associated with a first wireless cell. The communications manager 920 may be configured as or otherwise support a means for transmitting, to the UE, a system information update message indicating a modification of the first coverage area to a second coverage area associated with the first wireless cell, and an indication of one or more thresholds indicating transmission of an updated system information message associated with the modification of the first coverage area to the second coverage area of the first wireless cell. The communications manager 920 may be configured as or otherwise support a means for modifying the coverage area of the first wireless cell from the first coverage area to the second coverage area.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for reduced power consumption and increased power savings, more efficient utilization of system information signaling, and reduced time spent switching between idle or inactive states and active states of a device.

Figure 10:
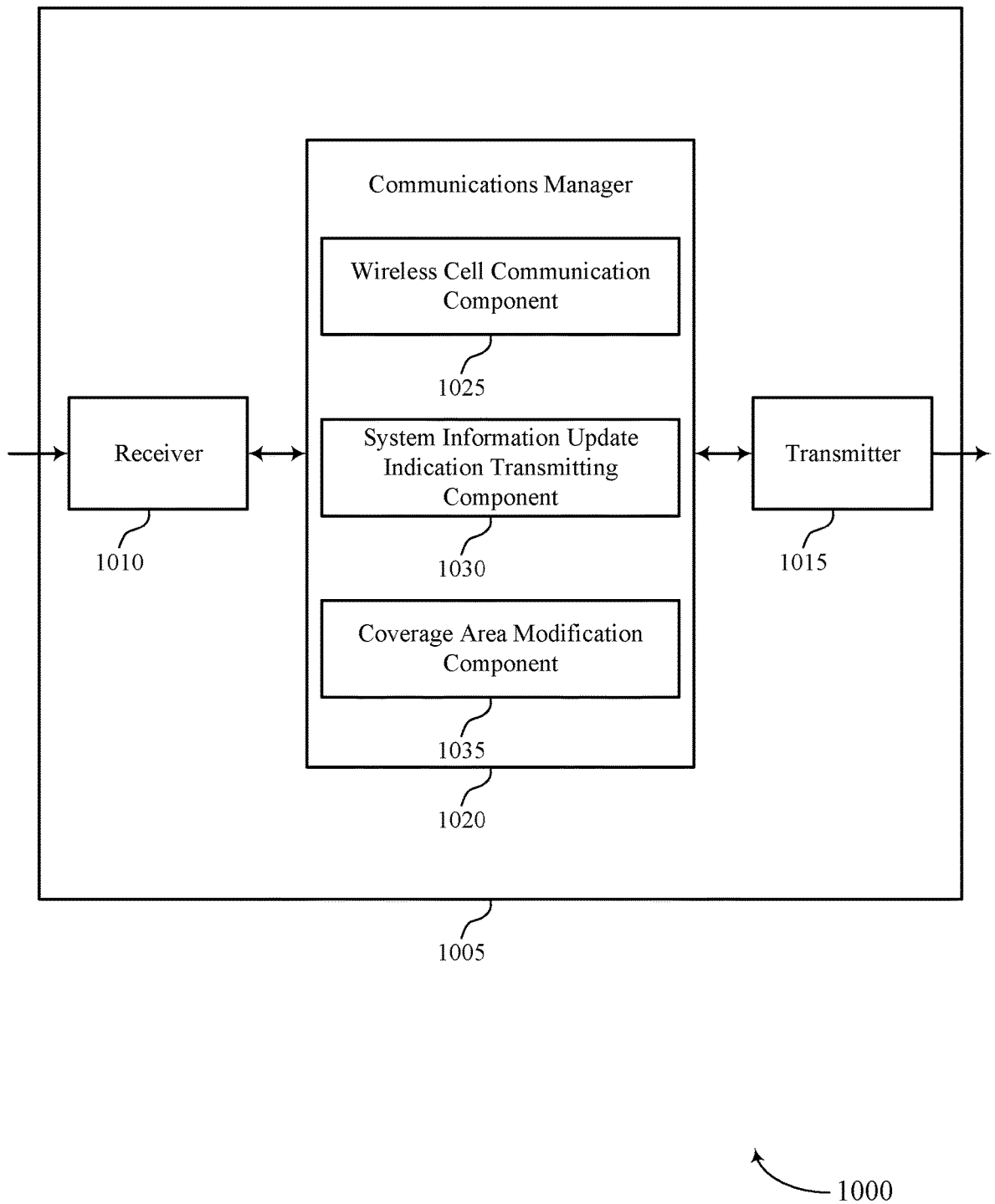

FIG. 10 shows a block diagram 1000 of a device 1005 that supports coverage adaptation and impact on idle UE in accordance with one or more aspects of the present disclosure. The device 1005 may be an example of aspects of a device 905 or a network entity 105 as described herein. The device 1005 may include a receiver 1010, a transmitter 1015, and a communications manager 1020. The device

1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of coverage adaptation and impact on idle UE as described herein. For example, the communications manager 1020 may include a wireless cell communication component 1025, a system information update indication transmitting component 1030, a coverage area modification component 1035, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a network entity in accordance with examples as disclosed herein. The wireless cell communication component 1025 may be configured as or otherwise support a means for communicating with a UE within a first coverage area associated with a first wireless cell. The system information update indication transmitting component 1030 may be configured as or otherwise support a means for transmitting, to the UE, a system information update message indicating a modification of the first coverage area to a second coverage area associated with the first wireless cell, and an indication of one or more thresholds indicating transmission of an updated system information message associated with the modification of the first coverage area to the second coverage area of the first wireless cell. The coverage area modification component 1035 may be configured as or otherwise support a means for modifying the coverage area of the first wireless cell from the first coverage area to the second coverage area.

Figure 11:
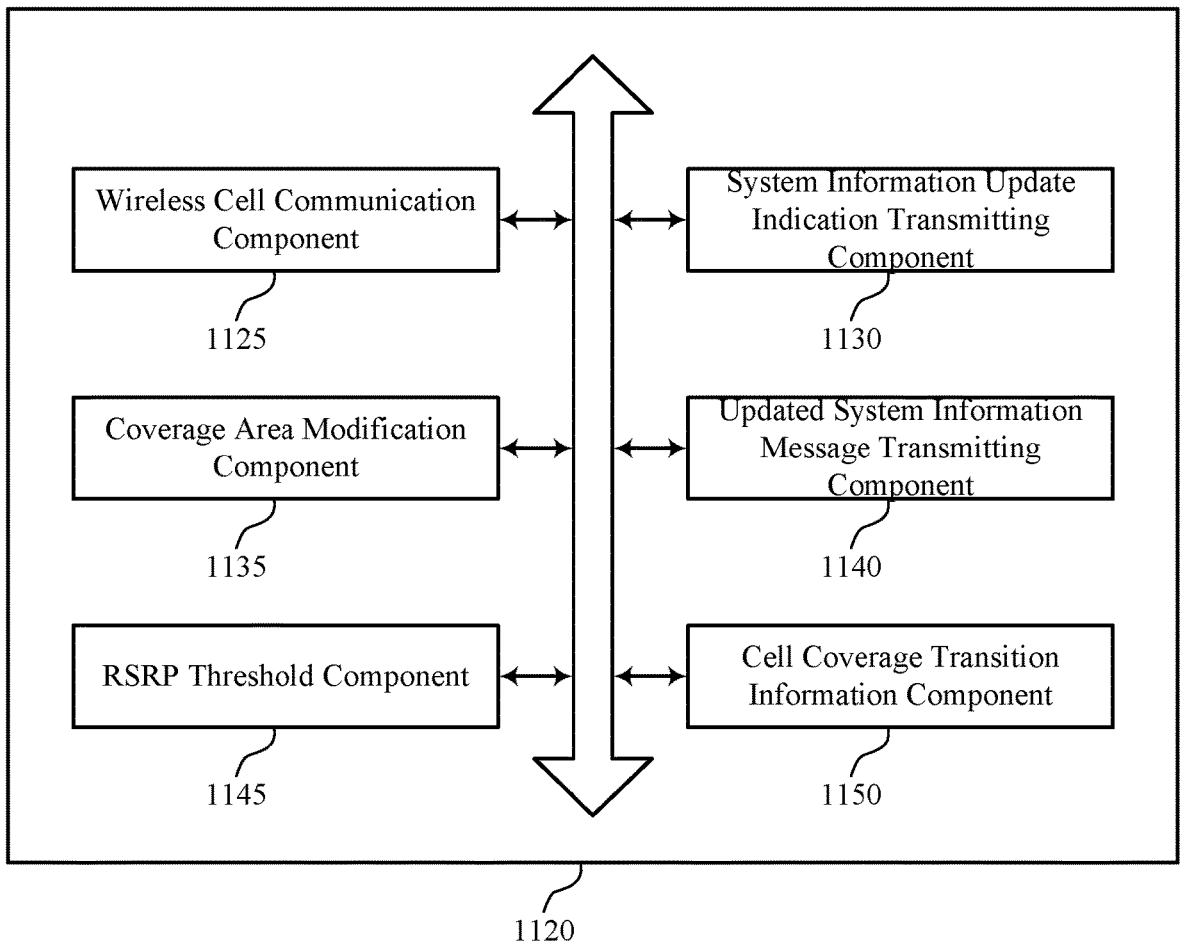
FIG. 11 shows a block diagram of a communications manager that supports coverage adaptation and impact on idle UE in accordance with one or more aspects of the present disclosure.

FIG. 11 shows a block diagram 1100 of a communications manager 1120 that supports coverage adaptation and impact on idle UE in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of coverage adaptation and impact on idle UE as described herein. For example, the communications manager 1120 may include a wireless cell communication component 1125, a system information update indication transmitting component 1130, a coverage area modification component 1135, an updated system information message transmitting component 1140, an RSRP threshold component 1145, a cell coverage transition information component 1150, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communication at a network entity in accordance with examples as disclosed herein. The wireless cell communication component 1125 may be configured as or otherwise support a means for communicating with a UE within a first coverage area associated with a first wireless cell. The system information update indication transmitting component 1130 may be configured as or otherwise support a means for transmitting, to the UE, a system information update message indicating a modification of the first coverage area to a second coverage area associated with the first wireless cell, and an indication of one or more thresholds indicating transmission of an updated system information message associated with the modification of the first coverage area to the second coverage area of the first wireless cell. The coverage area modification component 1135 may be configured as or otherwise support a means for modifying the coverage area of the first wireless cell from the first coverage area to the second coverage area.

In some examples, the one or more thresholds include a synchronization signal-reference signal receive power threshold, and the system information update indication transmitting component 1130 may be configured as or otherwise support a means for transmitting, in one or more bits of the system information update indication, a mapping that associates the synchronization signal-reference signal receive power threshold to the first coverage area or the second coverage area. In some examples, the one or more thresholds include a synchronization signal-reference signal receive power threshold, and the updated system information message transmitting component 1140 may be configured as or otherwise support a means for transmitting the updated system information message to the UE.

In some examples, the system information update indication transmitting component 1130 may be configured as or otherwise support a means for transmitting the system information update indication via a short message in a paging PDCCH or via a paging early indication-physical downlink control channel.

In some examples, the mapping indicates one or more UE groups that are associated with different synchronization signal-reference signal receive power thresholds, and the updated system information message transmitting component 1140 may be configured as or otherwise support a means for transmitting, to the UE, the updated system information message based on the mapping.

In some examples, the mapping indicates one or more UE groups that are associated with different synchronization signal-reference signal receive power thresholds, and the system information update indication transmitting component 1130 may be configured as or otherwise support a means for transmitting the system information update indication via a downlink control channel. In some examples, the mapping indicates one or more UE groups that are associated with different synchronization signal-reference signal receive power thresholds, and the RSRP threshold component 1145 may be configured as or otherwise support a means for transmitting the mapping via a downlink shared channel scheduled by the downlink control channel. In some examples, the mapping indicates one or more UE groups that are associated with different synchronization signal-reference signal receive power thresholds, and the updated system information message transmitting component 1140 may be configured as or otherwise support a means for transmitting updated system information message based on the mapping.

In some examples, the one or more thresholds include one or more coverage change thresholds, and the updated system information message transmitting component 1140 may be configured as or otherwise support a means for transmitting, to the UE, a list of one or more adjacent wireless cells different from the first wireless cell as part of the updated system information message, the one or more adjacent wireless cells being available for re-selection by the UE based on the coverage change of the first wireless cell satisfying the one or more coverage change thresholds.

In some examples, the updated system information message further indicates a change in synchronization signal transmission power associated with the first wireless cell.

In some examples, the list of one or more adjacent wireless cells further indicates a set of restricted cells being unavailable for re-selection by the UE based on the coverage change of the first wireless cell.

In some examples, the one or more thresholds include a timing threshold indicative of timing information for a time in which the modification of the first coverage area to the second coverage area of the first wireless cell is to occur, and the updated system information message transmitting component 1140 may be configured as or otherwise support a means for transmitting the updated system information message based on the timing threshold.

In some examples, the timing threshold includes a timing interval for a transition the first coverage area to the second coverage area of the first wireless cell, and the cell coverage transition information component 1150 may be configured as or otherwise support a means for transmitting, to the UE, cell coverage transition information, power ramping information, or both.

Figure 12:
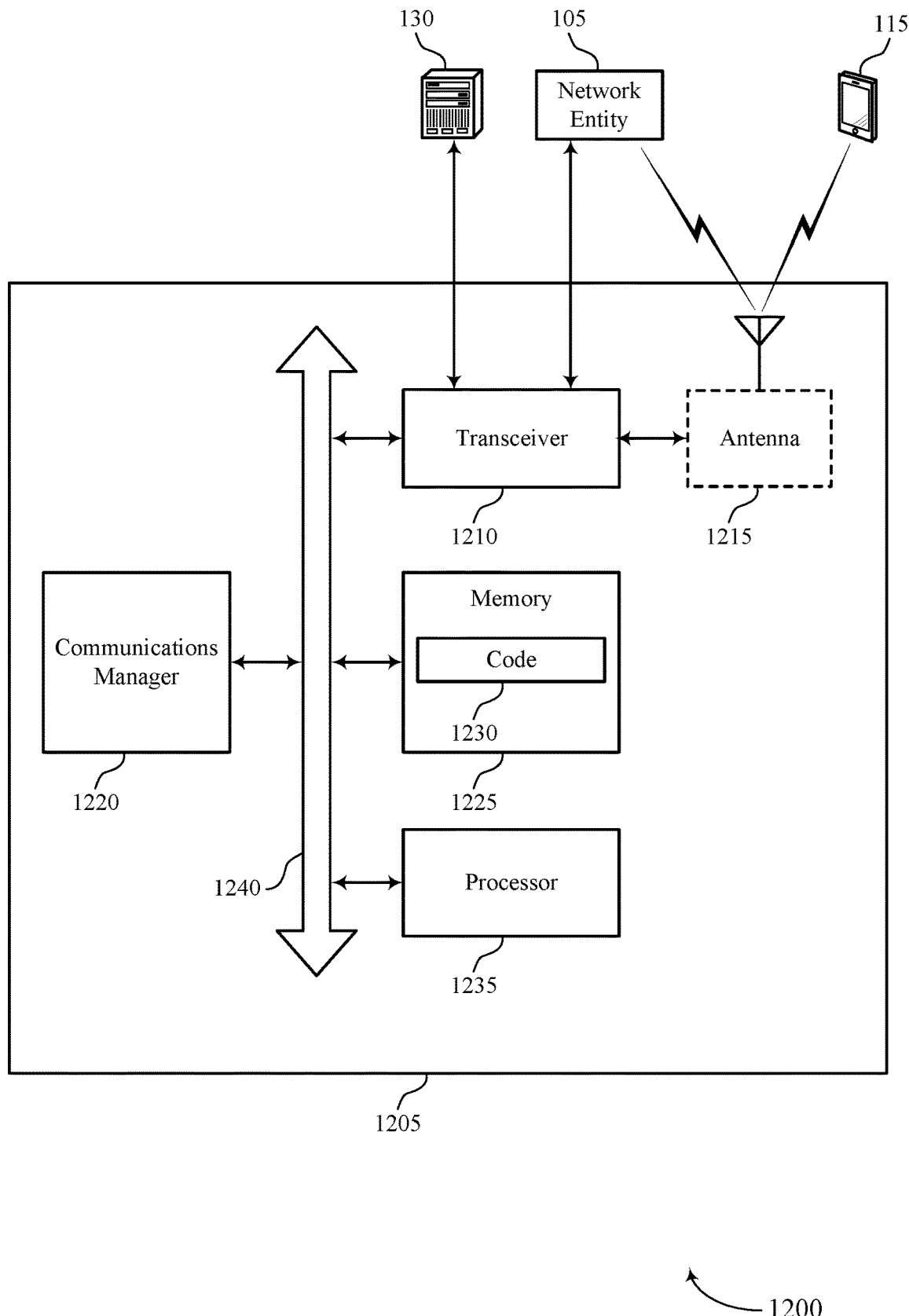
FIG. 12 shows a diagram of a system including a device that supports coverage adaptation and impact on idle UE in accordance with one or more aspects of the present disclosure.

FIG. 12 shows a diagram of a system 1200 including a device 1205 that supports coverage adaptation and impact on idle UE in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, a memory 1225, code 1230, and a processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. The transceiver 1210, or the transceiver 1210 and one or more antennas 1215 or wired interfaces, where applicable, may be an example of a transmitter 915, a transmitter 1015, a receiver 910, a receiver 1010, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1225 may include RAM and ROM. The memory 1225 may store computer-readable, computer-executable code 1230 including instructions that, when executed by the processor 1235, cause the device 1205 to perform various functions described herein. The code 1230 may be stored in a non-transitory computer-readable medium such as system memory or another type of memory. In some cases, the code 1230 may not be directly executable by the processor 1235 but may cause a computer (e.g., when compiled and executed) to perform functions described herein. In some cases, the memory 1225 may contain, among other things, a BIOS which may control basic hardware or software operation such as the interaction with peripheral components or devices.

The processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1235 may be configured to operate a memory array using a memory controller. In some other cases, a memory controller may be integrated into the processor 1235. The processor 1235 may be configured to execute computer-readable instructions stored in a memory (e.g., the memory 1225) to cause the device 1205 to perform various functions (e.g., functions or tasks supporting coverage adaptation and impact on idle UE). For example, the device 1205 or a component of the device 1205 may include a processor 1235 and memory 1225 coupled with the processor 1235, the processor 1235 and memory 1225 configured to perform various functions described herein. The processor 1235 may be an example of a cloud-computing platform (e.g., one or more physical nodes and supporting software such as operating systems, virtual machines, or container instances) that may host the functions (e.g., by executing code 1230) to perform the functions of the device 1205.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the memory 1225, the code 1230, and the processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communication at a network entity in accordance with examples as disclosed herein. For example, the communications manager 1220 may be configured as or otherwise support a means for communicating with a UE within a first coverage area associated with a first wireless cell. The communications manager 1220 may be configured as or otherwise support a means for transmitting, to the UE, a system information update message indicating a modification of the first coverage area to a second coverage area associated with the first wireless cell, and an indication of one or more thresholds indicating transmission of an updated system information message associated with the modification of the first coverage area to the second coverage area of the first wireless cell. The communications manager 1220 may be configured as or otherwise support a means for modifying the coverage area of the first wireless cell from the first coverage area to the second coverage area.

By including or configuring the communications manager 1220 in accordance with examples as described herein, the device 1205 may support techniques for improved communication reliability, improved user experience related to reduced battery usage and more efficient handover, reduced power consumption and increased power savings, more efficient utilization of communication resources, improved coordination and system information signaling between devices, longer battery life.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the processor 1235, the memory 1225, the code 1230, the transceiver 1210, or any combination thereof. For example, the code 1230 may include instructions executable by the processor 1235 to cause the device 1205 to perform various aspects of coverage adaptation and impact on idle UE as described herein, or the processor 1235 and the memory 1225 may be otherwise configured to perform or support such operations.

Figure 13:
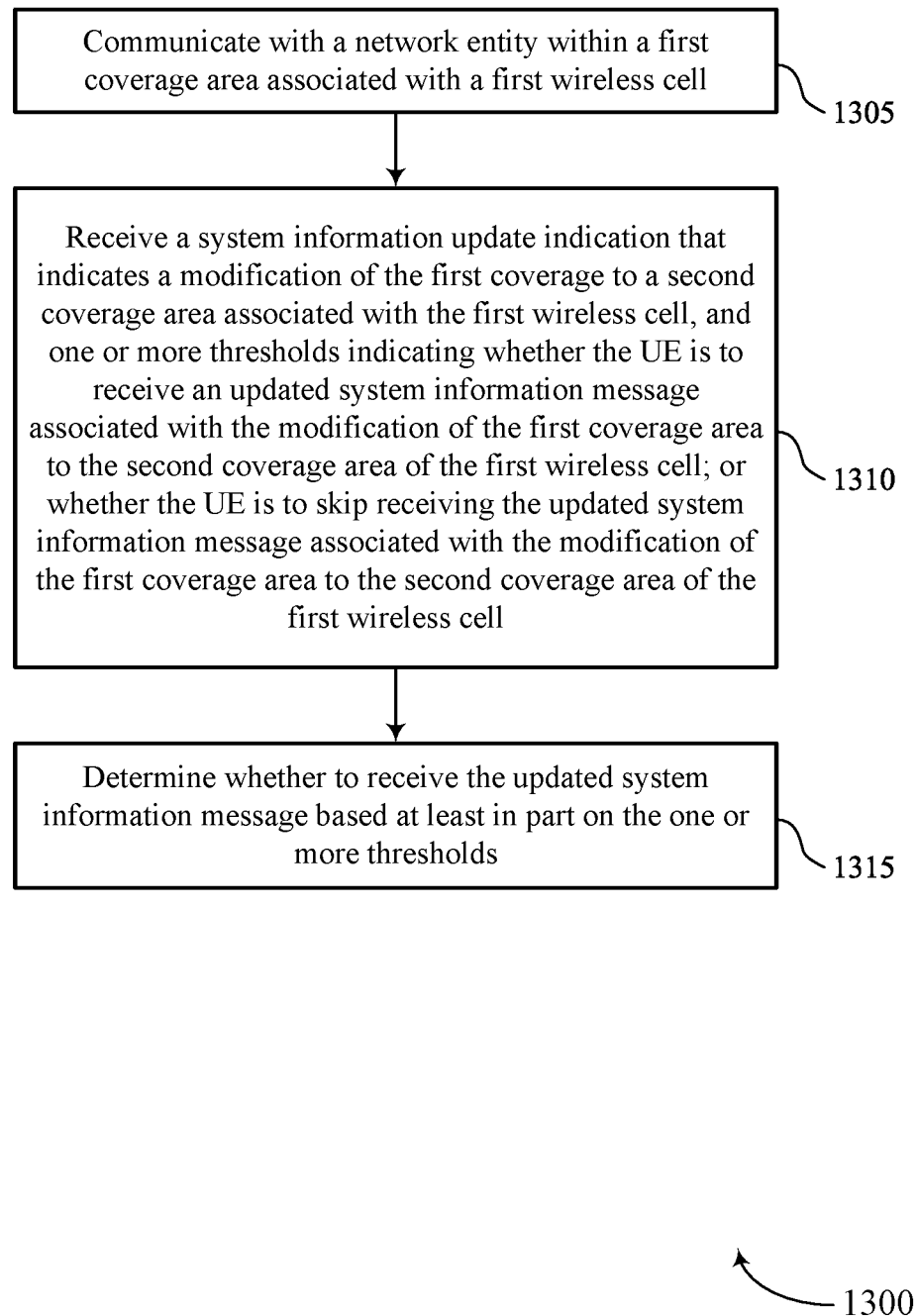
FIGS. 13 through 17 show flowcharts illustrating methods that support coverage adaptation and impact on idle UE in accordance with one or more aspects of the present disclosure.

FIG. 13 shows a flowchart illustrating a method 1300 that supports coverage adaptation and impact on idle UE in accordance with one or more aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include communicating with a network entity within a first coverage area associated with a first wireless cell. The operations of 1305 may be performed in accordance with examples as disclosed herein. In some examples, aspects of the operations of 1305 may be performed by a wireless cell communication component 725 as described with reference to FIG. 7.

At 1310, the method may include receiving a system information update indication that indicates a modification of the first coverage to a second coverage area associated with the first wireless cell, and one or more thresholds indicating whether the UE is to receive an updated system information message associated with the modification of the first coverage area to the second coverage area of the first wireless cell, or whether the UE is to skip receiving the updated system information message associated with the modification of the first coverage area to the second coverage area of the first wireless cell. The operations of 1310 may be performed in accordance with examples as disclosed herein. In some examples, aspects of the operations of 1310 may be performed by a system information update indication receiving component 730 as described with reference to FIG. 7.

At 1315, the method may include determining whether to receive the updated system information message based on the one or more thresholds. The operations of 1315 may be performed in accordance with examples as disclosed herein. In some examples, aspects of the operations of 1315 may be performed by a system information update indication receiving component 730 as described with reference to FIG. 7.

Figure 14:
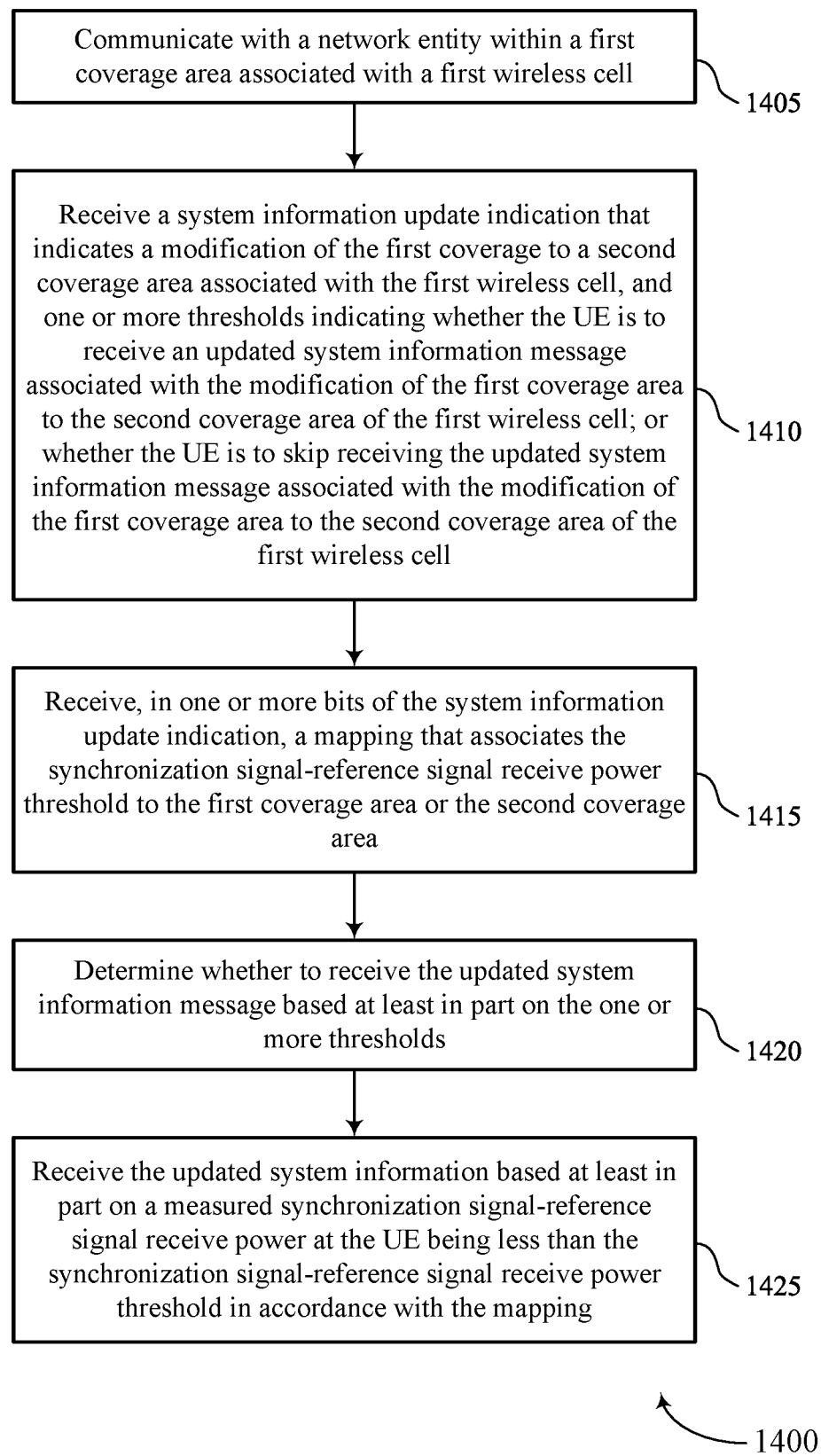

FIG. 14 shows a flowchart illustrating a method 1400 that supports coverage adaptation and impact on idle UE in accordance with one or more aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, the method may include communicating with a network entity within a first coverage area associated with a first wireless cell. The operations of 1405 may be performed in accordance with examples as disclosed herein. In some examples, aspects of the operations of 1405 may be performed by a wireless cell communication component 725 as described with reference to FIG. 7.

At 1410, the method may include receiving a system information update indication that indicates a modification of the first coverage to a second coverage area associated with the first wireless cell, and one or more thresholds indicating whether the UE is to receive an updated system information message associated with the modification of the first coverage area to the second coverage area of the first wireless cell, or whether the UE is to skip receiving the updated system information message associated with the modification of the first coverage area to the second coverage area of the first wireless cell. The operations of 1410 may be performed in accordance with examples as disclosed herein. In some examples, aspects of the operations of 1410 may be performed by a system information update indication receiving component 730 as described with reference to FIG. 7.

At 1415, the method may include receiving, in one or more bits of the system information update indication, a mapping that associates the synchronization signal-reference signal receive power threshold to the first coverage area or the second coverage area. The operations of 1415 may be performed in accordance with examples as disclosed herein. In some examples, aspects of the operations of 1415 may be performed by an RSRP threshold component 735 as described with reference to FIG. 7.

At 1420, the method may include determining whether to receive the updated system information message based on the one or more thresholds. The operations of 1420 may be performed in accordance with examples as disclosed herein. In some examples, aspects of the operations of 1420 may be performed by a system information update indication receiving component 730 as described with reference to FIG. 7.

At 1425, the method may include receiving the updated system information based on a measured synchronization signal-reference signal receive power at the UE being less than the synchronization signal-reference signal receive power threshold in accordance with the mapping. The operations of 1425 may be performed in accordance with examples as disclosed herein. In some examples, aspects of the operations of 1425 may be performed by an updated system information receiving component 740 as described with reference to FIG. 7.

Figure 15:
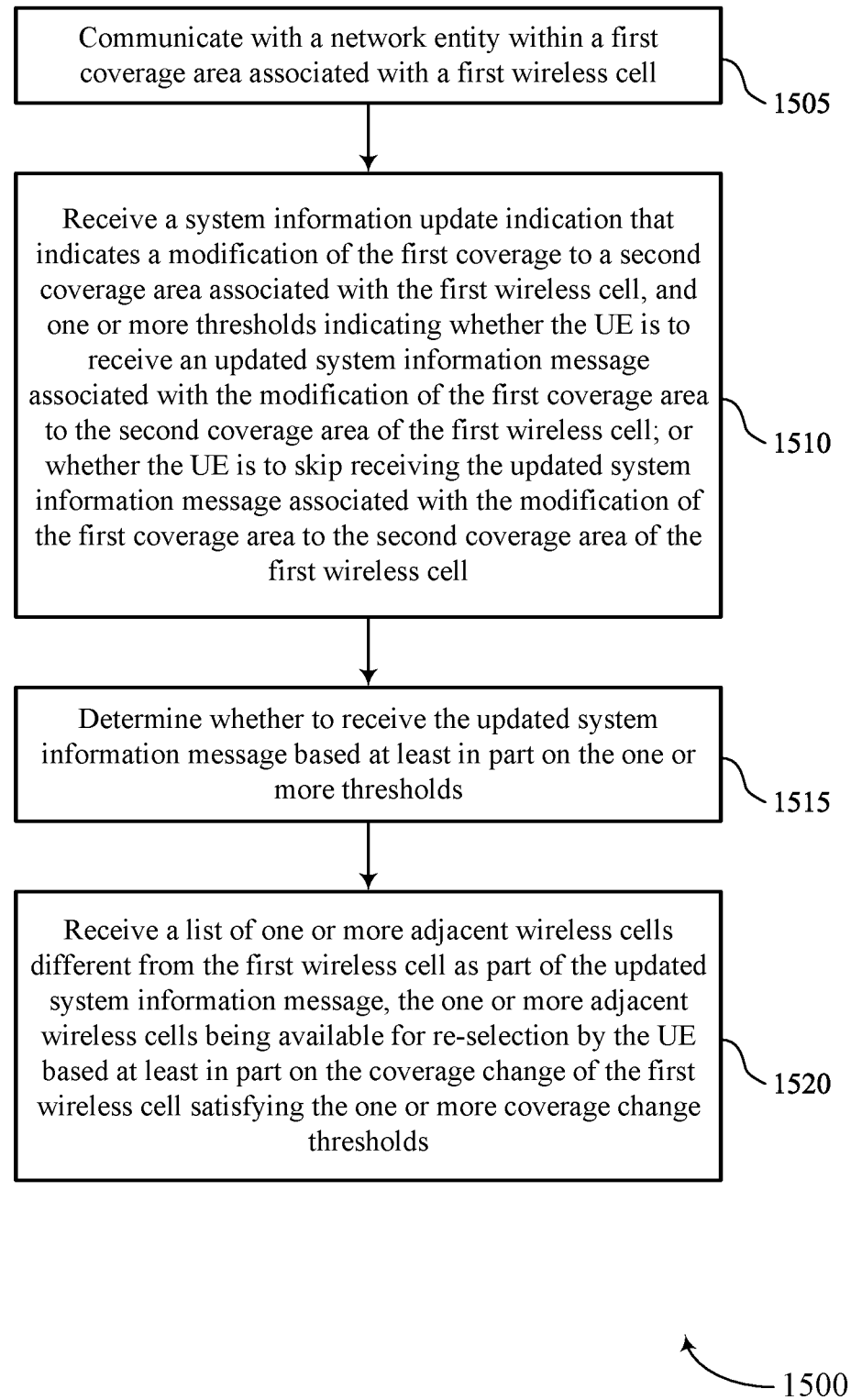

FIG. 15 shows a flowchart illustrating a method 1500 that supports coverage adaptation and impact on idle UE in accordance with one or more aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1505, the method may include communicating with a network entity within a first coverage area associated with a first wireless cell. The operations of 1505 may be performed in accordance with examples as disclosed herein. In some examples, aspects of the operations of 1505 may be performed by a wireless cell communication component 725 as described with reference to FIG. 7.

At 1510, the method may include receiving a system information update indication that indicates a modification of the first coverage to a second coverage area associated with the first wireless cell, and one or more thresholds indicating whether the UE is to receive an updated system information message associated with the modification of the first coverage area to the second coverage area of the first wireless cell, or whether the UE is to skip receiving the updated system information message associated with the modification of the first coverage area to the second coverage area of the first wireless cell. The operations of 1510 may be performed in accordance with examples as disclosed herein. In some examples, aspects of the operations of 1510 may be performed by a system information update indication receiving component 730 as described with reference to FIG. 7.

At 1515, the method may include determining whether to receive the updated system information message based on the one or more thresholds. The operations of 1515 may be performed in accordance with examples as disclosed herein. In some examples, aspects of the operations of 1515 may be performed by a system information update indication receiving component 730 as described with reference to FIG. 7.

At 1520, the method may include receiving a list of one or more adjacent wireless cells different from the first wireless cell as part of the updated system information message, the one or more adjacent wireless cells being available for re-selection by the UE based on the coverage change of the first wireless cell satisfying the one or more coverage change thresholds. The operations of 1520 may be performed in accordance with examples as disclosed herein. In some examples, aspects of the operations of 1520 may be performed by a wireless cell list evaluation component 750 as described with reference to FIG. 7.

Figure 16:
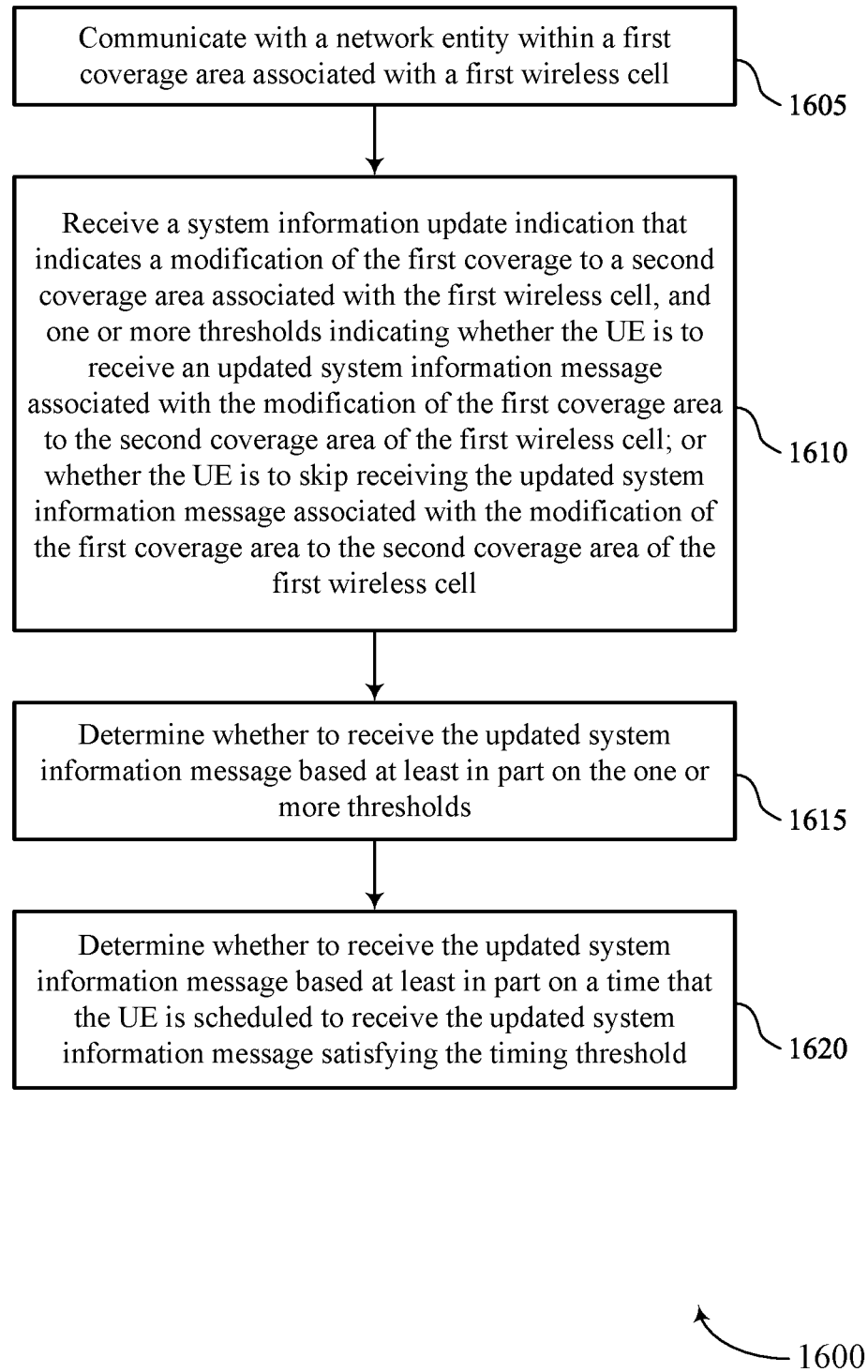

FIG. 16 shows a flowchart illustrating a method 1600 that supports coverage adaptation and impact on idle UE in accordance with one or more aspects of the present disclosure. The operations of the method 1600 may be implemented by a UE or its components as described herein. For example, the operations of the method 1600 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1605, the method may include communicating with a network entity within a first coverage area associated with a first wireless cell. The operations of 1605 may be performed in accordance with examples as disclosed herein. In some examples, aspects of the operations of 1605 may be performed by a wireless cell communication component 725 as described with reference to FIG. 7.

At 1610, the method may include receiving a system information update indication that indicates a modification of the first coverage to a second coverage area associated with the first wireless cell, and one or more thresholds indicating whether the UE is to receive an updated system information message associated with the modification of the first coverage area to the second coverage area of the first wireless cell, or whether the UE is to skip receiving the updated system information message associated with the modification of the first coverage area to the second coverage area of the first wireless cell. The operations of 1610 may be performed in accordance with examples as disclosed herein. In some examples, aspects of the operations of 1610 may be performed by a system information update indication receiving component 730 as described with reference to FIG. 7.

At 1615, the method may include determining whether to receive the updated system information message based on the one or more thresholds. The operations of 1615 may be performed in accordance with examples as disclosed herein. In some examples, aspects of the operations of 1615 may be performed by a system information update indication receiving component 730 as described with reference to FIG. 7.

At 1620, the method may include determining whether to receive the updated system information message based on a time that the UE is scheduled to receive the updated system information message satisfying the timing threshold. The operations of 1620 may be performed in accordance with examples as disclosed herein. In some examples, aspects of the operations of 1620 may be performed by a timing information component 755 as described with reference to FIG. 7.

Figure 17:
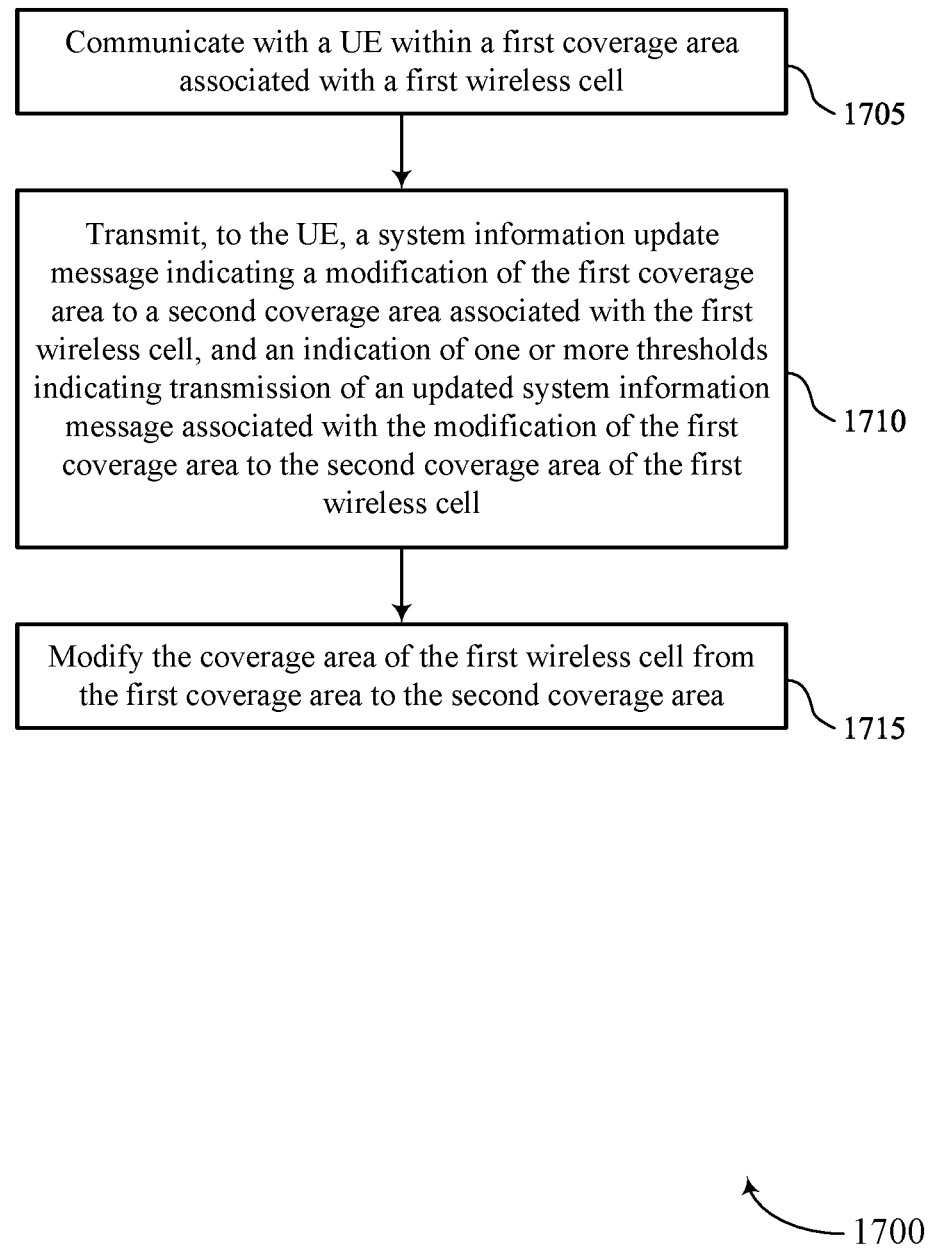

FIG. 17 shows a flowchart illustrating a method 1700 that supports coverage adaptation and impact on idle UE in accordance with one or more aspects of the present disclosure. The operations of the method 1700 may be implemented by a network entity or its components as described herein. For example, the operations of the method 1700 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1705, the method may include communicating with a UE within a first coverage area associated with a first wireless cell. The operations of 1705 may be performed in accordance with examples as disclosed herein. In some examples, aspects of the operations of 1705 may be performed by a wireless cell communication component 1125 as described with reference to FIG. 11.

At 1710, the method may include transmitting, to the UE, a system information update message indicating a modification of the first coverage area to a second coverage area associated with the first wireless cell, and an indication of one or more thresholds indicating transmission of an updated system information message associated with the modification of the first coverage area to the second coverage area of the first wireless cell. The operations of 1710 may be performed in accordance with examples as disclosed herein. In some examples, aspects of the operations of 1710 may be performed by a system information update indication transmitting component 1130 as described with reference to FIG. 11.

At 1715, the method may include modifying the coverage area of the first wireless cell from the first coverage area to the second coverage area. The operations of 1715 may be performed in accordance with examples as disclosed herein. In some examples, aspects of the operations of 1715 may be performed by a coverage area modification component 1135 as described with reference to FIG. 11.

The following provides an overview of aspects of the present disclosure:

Aspect 1: A method for wireless communication at a UE, comprising: communicating with a network entity within a first coverage area associated with a first wireless cell; receiving an SI update indication that indicates a modification of the first coverage to a second coverage area associated with the first wireless cell, and one or more thresholds indicating whether the UE is to receive an updated SI message associated with the modification of the first coverage area to the second coverage area of the first wireless cell; or whether the UE is to skip receiving the updated SI message associated with the modification of the first coverage area to the second coverage area of the first wireless cell; and determining whether to receive the updated SI message based at least in part on the one or more thresholds.

Aspect 2: The method of aspect 1, wherein the one or more thresholds comprise a SS-RSRP threshold, and the method further comprises: receiving, in one or more bits of the SI update indication, a mapping that associates the SS-RSRP threshold to the first coverage area or the second coverage area; and receiving the updated SI based at least in part on a measured SS-RSRP at the UE being less than the SS-RSRP threshold in accordance with the mapping.

Aspect 3: The method of aspect 2, further comprising: receiving the SI update indication via a short message in a paging PDCCH or via a PEI-PDCCH.

Aspect 4: The method of any of aspects 2 through 3, wherein the mapping indicates one or more UE groups that are associated with different SS-RSRP thresholds, and the method further comprises: determining, in accordance with the mapping, that the UE is part of a UE group of the one or more UE groups that is to receive the updated SI message based at least in part on the SS-RSRP threshold; and receiving the updated SI message based at least in part on the determining.

Aspect 5: The method of aspect 4, wherein the mapping is further based at least in part on a mobility state of the UE.

Aspect 6: The method of any of aspects 2 through 5, wherein the mapping indicates one or more UE groups that are associated with different SS-RSRP thresholds, and the method further comprises: receiving the SI update indication via a downlink control channel; receiving the mapping via a downlink shared channel scheduled by the downlink control channel; and receiving the updated SI message based at least in part on the mapping.

Aspect 7: The method of any of aspects 1 through 6, wherein the SI update indication further comprises one or more cell selection parameters associated with the updated SI message.

Aspect 8: The method of any of aspects 1 through 7, further comprising: receiving a control message that indicates a change in one or more modes of operation associated with the modification of the first coverage area to the second coverage area of the first wireless cell.

Aspect 9: The method of aspect 8, wherein the modification of the first coverage area to the second coverage area of the first wireless cell indicates a deactivation of at least a portion of the first wireless cell, an activation of at least a portion of the first wireless cell, a change in coverage of the first wireless cell, or any combination thereof.

Aspect 10: The method of any of aspects 1 through 9, wherein the one or more thresholds comprise one or more coverage change thresholds, and the method further comprises: receiving a list of one or more adjacent wireless cells different from the first wireless cell as part of the updated SI message, the one or more adjacent wireless cells being available for re-selection by the UE based at least in part on the coverage change of the first wireless cell satisfying the one or more coverage change thresholds.

Aspect 11: The method of aspect 10, wherein the list of one or more adjacent wireless cells is based at least in part on one or more beam directions associated with the first wireless cell.

Aspect 12: The method of any of aspects 10 through 11, wherein the updated SI message further indicates a change in synchronization signal transmission power associated with the first wireless cell.

Aspect 13: The method of any of aspects 10 through 12, wherein the list of one or more adjacent wireless cells further indicates a set of restricted cells being unavailable for re-selection by the UE based at least in part on the coverage change of the first wireless cell.

Aspect 14: The method of any of aspects 1 through 13, wherein the one or more thresholds comprise a timing threshold indicative of timing information for a time in which the modification of the first coverage area to the second coverage area of the first wireless cell is to occur, and the method further comprises: determining whether to receive the updated SI message based at least in part on a time that the UE is scheduled to receive the updated SI message satisfying the timing threshold.

Aspect 15: The method of aspect 14, further comprising: receiving the timing threshold indicative of the timing information via a downlink shared channel scheduled by a downlink control channel, the downlink control channel scrambled by a RNTI associated with the updated SI message.

Aspect 16: The method of any of aspects 14 through 15, wherein the timing threshold is further indicative of a time in which the first wireless cell restricts access for the UE, enables access for the UE, changes relative transmission power, or any combination thereof.

Aspect 17: The method of any of aspects 14 through 16, wherein the timing threshold comprises a relative timing threshold or an absolute timing threshold based at least in part on the modification of the first coverage area to the second coverage area of the first wireless cell.

Aspect 18: The method of any of aspects 14 through 17, wherein the timing threshold comprises a timing interval for a transition the first coverage area to the second coverage area of the first wireless cell, and the method further comprises: receiving cell coverage transition information, power ramping information, or both, to apply during the transition the first coverage area to the second coverage area.

Aspect 19: A method for wireless communication at a network entity, comprising: communicating with a UE within a first coverage area associated with a first wireless cell; transmitting, to the UE, an SI update message indicating a modification of the first coverage area to a second coverage area associated with the first wireless cell, and an indication of one or more thresholds indicating transmission of an updated SI message associated with the modification of the first coverage area to the second coverage area of the first wireless cell; modifying the coverage area of the first wireless cell from the first coverage area to the second coverage area.

Aspect 20: The method of aspect 19, wherein the one or more thresholds comprise a SS-RSRP threshold, and the method further comprises: transmitting, in one or more bits of the SI update indication, a mapping that associates the SS-RSRP threshold to the first coverage area or the second coverage area; and transmitting the updated SI message to the UE.

Aspect 21: The method of aspect 20, further comprising: transmitting the SI update indication via a short message in a paging PDCCH or via a PEI-PDCCH.

Aspect 22: The method of any of aspects 20 through 21, wherein the mapping indicates one or more UE groups that are associated with different SS-RSRP thresholds, and the method further comprises: transmitting, to the UE, the updated SI message based at least in part on the mapping.

Aspect 23: The method of any of aspects 20 through 22, wherein the mapping indicates one or more UE groups that are associated with different SS-RSRP thresholds, and the method further comprises: transmitting the SI update indication via a downlink control channel; transmitting the mapping via a downlink shared channel scheduled by the downlink control channel; and transmitting updated SI message based at least in part on the mapping.

Aspect 24: The method of any of aspects 19 through 23, wherein the one or more thresholds comprise one or more coverage change thresholds, and the method further comprises: transmitting, to the UE, a list of one or more adjacent wireless cells different from the first wireless cell as part of the updated SI message, the one or more adjacent wireless cells being available for re-selection by the UE based at least in part on the coverage change of the first wireless cell satisfying the one or more coverage change thresholds.

Aspect 25: The method of aspect 24, wherein the updated SI message further indicates a change in synchronization signal transmission power associated with the first wireless cell.

Aspect 26: The method of any of aspects 24 through 25, wherein the list of one or more adjacent wireless cells further indicates a set of restricted cells being unavailable for re-selection by the UE based at least in part on the coverage change of the first wireless cell.

Aspect 27: The method of any of aspects 19 through 26, wherein the one or more thresholds comprise a timing threshold indicative of timing information for a time in which the modification of the first coverage area to the second coverage area of the first wireless cell is to occur, and the method further comprises: transmitting the updated SI message based at least in part on the timing threshold.

Aspect 28: The method of aspect 27, wherein the timing threshold comprises a timing interval for a transition the first coverage area to the second coverage area of the first wireless cell, and the method further comprises: transmitting, to the UE, cell coverage transition information, power ramping information, or both.

Aspect 29: An apparatus for wireless communication at a UE, comprising a processor; memory coupled with the processor; and instructions stored in the memory and executable by the processor to cause the apparatus to perform a method of any of aspects 1 through 18.

Aspect 30: An apparatus for wireless communication at a UE, comprising at least one means for performing a method of any of aspects 1 through 18.

Aspect 31: A non-transitory computer-readable medium storing code for wireless communication at a UE, the code comprising instructions executable by a processor to perform a method of any of aspects 1 through 18.

Aspect 32: An apparatus for wireless communication at a network entity, comprising a processor; memory coupled with the processor; and instructions stored in the memory and executable by the processor to cause the apparatus to perform a method of any of aspects 19 through 28.

Aspect 33: An apparatus for wireless communication at a network entity, comprising at least one means for performing a method of any of aspects 19 through 28.

Aspect 34: A non-transitory computer-readable medium storing code for wireless communication at a network entity, the code comprising instructions executable by a processor to perform a method of any of aspects 19 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   communicating with a network entity within a first coverage area associated with a first wireless cell;
   receiving a system information update message that indicates a modification of the first coverage area to a second coverage area associated with the first wireless cell, one or more thresholds comprising at least a synchronization signal-reference signal receive power threshold, and one or more bits that indicate a mapping that associates the synchronization signal-reference signal receive power threshold to the first coverage area or the second coverage area, the one or more thresholds indicating whether the UE is to receive an updated system information message associated with the modification of the first coverage area to the second coverage area of the first wireless cell, or whether the UE is to skip receiving the updated system information message associated with the modification of the first coverage area to the second coverage area of the first wireless cell; and
   receiving the updated system information message based at least in part on a measured synchronization signal-reference signal receive power at the UE being less than the synchronization signal-reference signal receive power threshold in accordance with the mapping.

2. The method of claim 1, further comprising:
   receiving the system information update message via a short message in a paging physical downlink control channel (PDCCH) or via a paging early indication-physical downlink control channel.

3. The method of claim 1, wherein the mapping indicates one or more UE groups that are associated with different synchronization signal-reference signal receive power thresholds, and the method further comprises:
   determining, in accordance with the mapping, that the UE is part of a UE group of the one or more UE groups that is to receive the updated system information message based at least in part on the synchronization signal-reference signal receive power threshold; and
   receiving the updated system information message based at least in part on determining that the UE is part of the UE group that is to receive the updated system information message.

4. The method of claim 3, wherein the mapping is further based at least in part on a mobility state of the UE.

5. The method of claim 1, wherein the mapping indicates one or more UE groups that are associated with different synchronization signal-reference signal receive power thresholds, and the method further comprises:
   receiving the system information update message via a downlink control channel;
   receiving the mapping via a downlink shared channel scheduled by the downlink control channel; and
   receiving the updated system information message based at least in part on the mapping.

6. The method of claim 1, wherein the system information update message further comprises one or more cell selection parameters associated with the updated system information message.

7. The method of claim 1, further comprising:
   receiving a control message that indicates a change in one or more modes of operation associated with the modification of the first coverage area to the second coverage area of the first wireless cell.

8. The method of claim 7, wherein the modification of the first coverage area to the second coverage area of the first wireless cell indicates a deactivation of at least a portion of the first wireless cell, an activation of at least a portion of the first wireless cell, a change in coverage of the first wireless cell, or any combination thereof.

9. The method of claim 1, wherein the one or more thresholds comprise one or more coverage change thresholds, and the method further comprises:
   receiving a list of one or more adjacent wireless cells different from the first wireless cell as part of the updated system information message, the list of one or more adjacent wireless cells being available for re-selection by the UE based at least in part on a coverage change of the first wireless cell satisfying the one or more coverage change thresholds.

10. The method of claim 9, wherein the list of one or more adjacent wireless cells is based at least in part on one or more beam directions associated with the first wireless cell.

11. The method of claim 9, wherein the updated system information message further indicates a change in synchronization signal transmission power associated with the first wireless cell.

12. The method of claim 9, wherein the list of one or more adjacent wireless cells further indicates a set of restricted cells being unavailable for re-selection by the UE based at least in part on the coverage change of the first wireless cell.

13. The method of claim 1, wherein the one or more thresholds comprise a timing threshold indicative of timing information for a time in which the modification of the first coverage area to the second coverage area of the first wireless cell is to occur, and the method further comprises:
   determining whether to receive the updated system information message based at least in part on a time that the UE is scheduled to receive the updated system information message satisfying the timing threshold.

14. The method of claim 13, further comprising:
   receiving the timing threshold indicative of the timing information via a downlink shared channel scheduled by a downlink control channel, the downlink control channel scrambled by a radio network temporary identifier associated with the updated system information message.

15. The method of claim 13, wherein the timing threshold is further indicative of a time in which the first wireless cell restricts access for the UE, enables access for the UE, changes relative transmission power, or any combination thereof.

16. The method of claim 13, wherein the timing threshold comprises a relative timing threshold or an absolute timing threshold based at least in part on the modification of the first coverage area to the second coverage area of the first wireless cell.

17. The method of claim 13, wherein the timing threshold comprises a timing interval for a transition the first coverage area to the second coverage area of the first wireless cell, and the method further comprises:
receiving cell coverage transition information, power ramping information, or both, to apply during the transition the first coverage area to the second coverage area.

18. A method for wireless communication at a network entity, comprising:
communicating with a user equipment (UE) within a first coverage area associated with a first wireless cell;
transmitting, to the UE, a system information update message indicating a modification of the first coverage area to a second coverage area associated with the first wireless cell, an indication of one or more thresholds comprising at least a synchronization signal-reference signal receive power threshold, and one or more bits that indicate a mapping that associates the synchronization signal-reference signal receive power threshold to the first coverage area or the second coverage area, the one or more thresholds indicating transmission of an updated system information message associated with the modification of the first coverage area to the second coverage area of the first wireless cell;
modifying an allocated coverage area of the first wireless cell from the first coverage area to the second coverage area; and
transmitting the updated system information message to the UE.

19. The method of claim 18, further comprising:
transmitting the system information update message via a short message in a paging physical downlink control channel (PDCCH) or via a paging early indication-physical downlink control channel.

20. The method of claim 18, wherein the mapping indicates one or more UE groups that are associated with different synchronization signal-reference signal receive power thresholds, and the method further comprises:
transmitting, to the UE, the updated system information message based at least in part on the mapping.

21. The method of claim 18, wherein the mapping indicates one or more UE groups that are associated with different synchronization signal-reference signal receive power thresholds, and the method further comprises:
transmitting the system information update message via a downlink control channel;
transmitting the mapping via a downlink shared channel scheduled by the downlink control channel; and
transmitting the updated system information message based at least in part on the mapping.

22. The method of claim 18, wherein the one or more thresholds comprise one or more coverage change thresholds, and the method further comprises:
transmitting, to the UE, a list of one or more adjacent wireless cells different from the first wireless cell as part of the updated system information message, the list of one or more adjacent wireless cells being available for re-selection by the UE based at least in part on a coverage change of the first wireless cell satisfying the one or more coverage change thresholds.

23. The method of claim 22, wherein the updated system information message further indicates a change in synchronization signal transmission power associated with the first wireless cell.

24. The method of claim 22, wherein the list of one or more adjacent wireless cells further indicates a set of restricted cells being unavailable for re-selection by the UE based at least in part on the coverage change of the first wireless cell.

25. The method of claim 18, wherein the one or more thresholds comprise a timing threshold indicative of timing information for a time in which the modification of the first coverage area to the second coverage area of the first wireless cell is to occur, and the method further comprises:
transmitting the updated system information message based at least in part on the timing threshold.

26. The method of claim 25, wherein the timing threshold comprises a timing interval for a transition the first coverage area to the second coverage area of the first wireless cell, and the method further comprises:
transmitting, to the UE, cell coverage transition information, power ramping information, or both.

27. An apparatus for wireless communication at a user equipment (UE), comprising:
one or more processors;
one or more memories coupled with the one or more processors; and
instructions stored in the one or more memories and executable by the one or more processors to cause the apparatus to:
communicate with a network entity within a first coverage area associated with a first wireless cell;
receive a system information update message that indicates a modification of the first coverage area to a second coverage area associated with the first wireless cell, and one or more thresholds comprising at least a synchronization signal-reference signal receive power threshold, and one or more bits that indicate a mapping that associates the synchronization signal-reference signal receive power threshold to the first coverage area or the second coverage area, the one or more thresholds indicating whether the UE is to receive an updated system information message associated with the modification of the first coverage area to the second coverage area of the first wireless cell, or whether the UE is to skip receiving the updated system information message associated with the modification of the first coverage area to the second coverage area of the first wireless cell; and
receive the updated system information message based at least in part on a measured synchronization signal-reference signal receive power at the UE being less than the synchronization signal-reference signal receive power threshold in accordance with the mapping.

28. An apparatus for wireless communication at a network entity, comprising:
one or more processors;
one or more memories coupled with the one or more processors; and
instructions stored in the one or more memories and executable by the one or more processors to cause the apparatus to:
communicate with a user equipment (UE) within a first coverage area associated with a first wireless cell;

transmit, to the UE, a system information update message indicating a modification of the first coverage area to a second coverage area associated with the first wireless cell, an indication of one or more thresholds comprising at least a synchronization signal-reference signal receive power threshold, and one or more bits that indicate a mapping that associates the synchronization signal-reference signal receive power threshold to the first coverage area or the second coverage area, the one or more thresholds indicating transmission of an updated system information message associated with the modification of the first coverage area to the second coverage area of the first wireless cell;

modify an allocated coverage area of the first wireless cell from the first coverage area to the second coverage area; and transmit the updated system information message to the UE.

* * * * *